United States Patent [19]

Julich

[11] Patent Number: 5,725,979
[45] Date of Patent: Mar. 10, 1998

[54] METHOD AND IMPLEMENTING SUB-ASSEMBLIES AND ASSEMBLY TO FLATTEN PHOTOGRAPHIC FILM DURING PICTURE-TAKING

[76] Inventor: Harry Julich, 6807 Winter La., Annandale, Va. 22003

[21] Appl. No.: 487,302

[22] Filed: Jun. 7, 1995

[51] Int. Cl.⁶ ............... G03B 17/00; G03B 17/26; G03B 17/28; G03C 3/00

[52] U.S. Cl. ............ 430/30; 430/496; 430/501; 430/523; 430/140; 355/75; 352/221; 396/440; 396/441

[58] Field of Search ............... 354/203; 355/75; 352/221; 430/496, 501, 523, 140, 30; 396/440, 441

[56] References Cited

U.S. PATENT DOCUMENTS

| | | | |
|---|---|---|---|
| 2,604,831 | 7/1952 | Fraenckel | 354/203 |
| 3,782,947 | 1/1974 | Krall | 430/140 |
| 3,993,488 | 11/1976 | Oishi | 354/276 |
| 4,188,115 | 2/1980 | Marvin | 355/75 |
| 4,279,945 | 7/1981 | Audran et al. | 427/130 |
| 4,341,855 | 7/1982 | Morrison et al. | 430/140 |
| 5,254,449 | 10/1993 | James et al. | 430/533 |
| 5,368,995 | 11/1994 | Christian et al. | 430/530 |

FOREIGN PATENT DOCUMENTS

| | | | |
|---|---|---|---|
| 1351889 | 12/1963 | France | 354/203 |
| 57-151926 | 9/1982 | Japan | 354/203 |
| 4-214544 | 8/1992 | Japan | 354/203 |

*Primary Examiner*—Mark F. Huff
*Attorney, Agent, or Firm*—Bacon & Thomas

[57] ABSTRACT

A method and apparatus for flattening photographic film at the time of picture-taking involves applying a force-field to a photographic film made responsive to said force field to attract it against a reference surface. The force field may be electric, magnetic, AC, DC, or a combination of these.

49 Claims, 10 Drawing Sheets

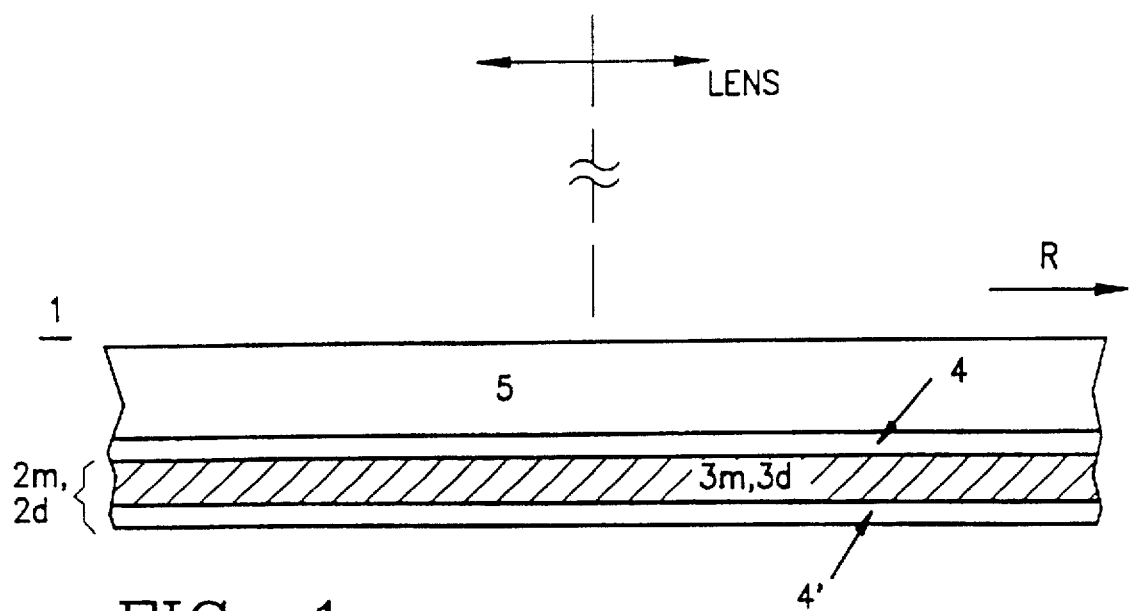
FIG. 1a
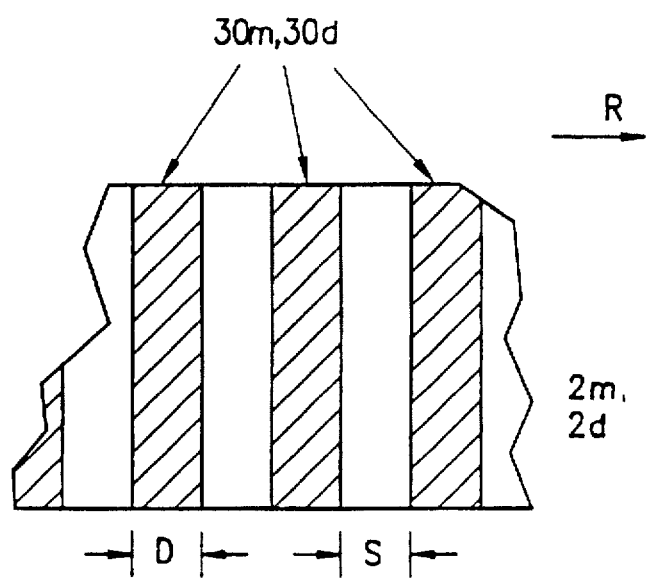
FIG. 1a'
FIG. 1a''
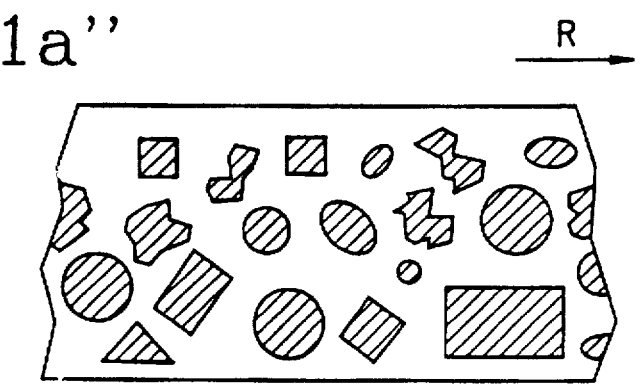

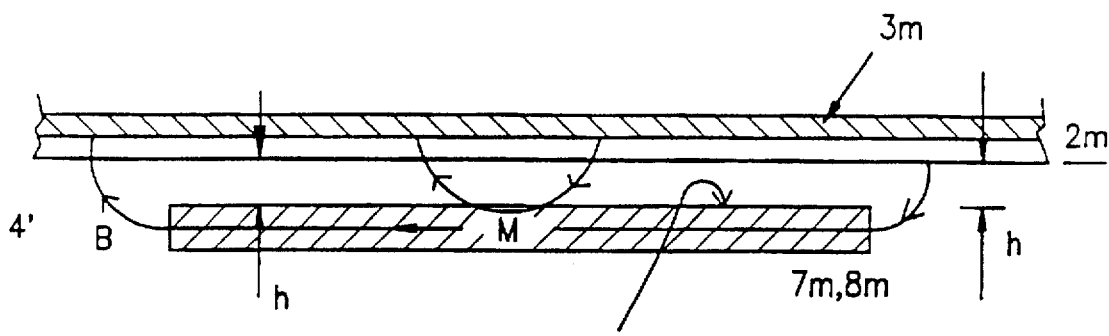
FIG. 2a'
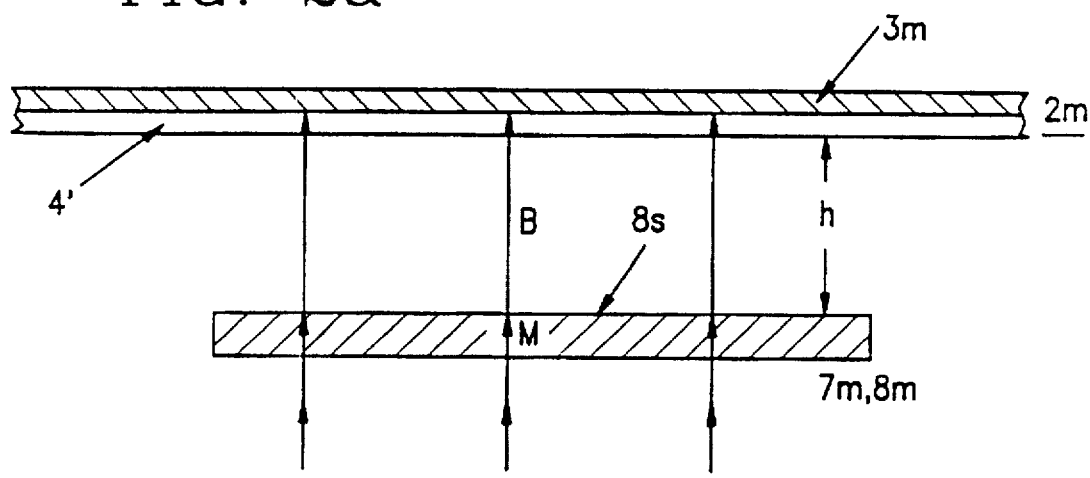
FIG. 2a
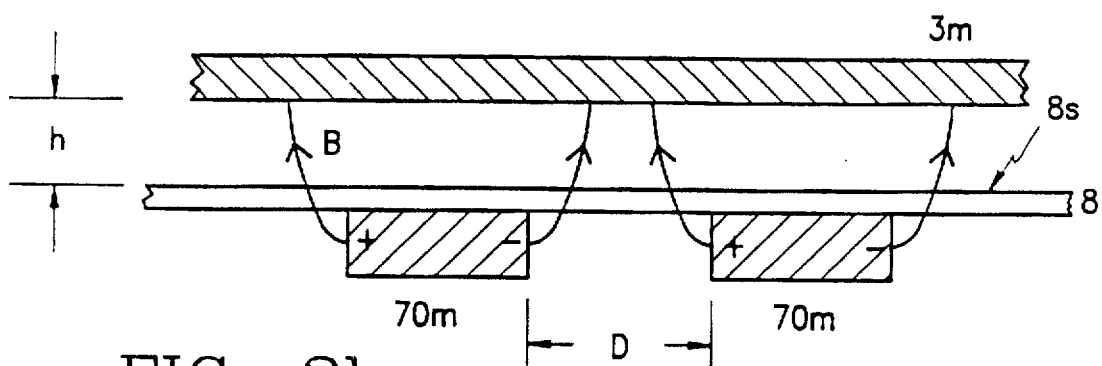
FIG. 2b
FIG. 2c

METHOD AND IMPLEMENTING SUB-ASSEMBLIES AND ASSEMBLY TO FLATTEN PHOTOGRAPHIC FILM DURING PICTURE-TAKING

BACKGROUND OF THE INVENTION

1. Field of the Invention

This invention relates to the field of photography, and in particular to apparatus for flattening flexible photographic film at the image area in order to make possible uniform focusing across the image plane and ensure optimal image sharpness. It will be understood by those skilled in the art that the word "photography" is intended to encompass any application in which an optical image is captured by a light sensitive medium or "film."

2. Description of Related Art

A serious but much neglected problem encountered in photography is that warping of the film will cause the film to deviate from the image plane, and make it impossible to achieve optimal image sharpness. No matter how accurate the optical components of the image capture device or "camera," an ideally geometrically sharp image is, in practice, impossible to obtain using conventional equipment due to warpage of the film and consequently separation of the film from the pressure plate (or sheetfilm holder partition), conventionally provided as film-plane reference-surface means, will take place.

Once normal focusing of the film has been carded out in a camera only conventionally fitted with a pressure plate or sheetfilm-holder partition, the film warp is typically of sufficient magnitude to be the critical parameter in determining image sharpness. The problem is most acute for medium format films such as 120/220 films, but it also significantly affects 35 mm and large-film formats, and it affects all conventional cameras regardless of price.

Aside the intrinsic film warp, the 120 film format in particular is subject to further film detachment due to the paper backing used in this format. Moreover, even if the paper backing were removed, and palliation achieved to that extent, the bare film still would excessively detach per se from the pressure plate and would still preclude uniform, sharp focusing.

Attempts have been made to address the problem of rollfilm or sheetfilm detachment by providing pneumatic suction devices that will pull the film against the film reference-surface means. Such suction devices, however, are inherently bulky, cumbersome and thereby unsuitable for use, both outdoors and indoors, except in exceedingly circumscribed conditions.

Other attempts to flatten the film in the camera have resorted to compressing the film between a glass plate and the pressure plate. Such configurations however entail the substantive drawbacks of inserting into the imaging path another optical element which, being in contact with the emulsion, moreover will inherently soil quickly. Such "solutions" have long been abandoned.

Consequently, aside from a few unsatisfactory attempts at remedy, the problem of film detachment has as a rule been ignored. Currently, there do not appear to be any significant efforts to address the problem, as evidenced for example by the fact that the text *Image Clarity* by John B. Williams, 224 pp, Focal Press, 1990, which deals solely with image sharpness, fails to address the problem of film detachment.

It is true that the state of the art already comprises photographic films with layers of magnetic material, and that one aspect of the present invention involves the use of a multi-layer laminate affixed to a film (in cooperation with a force-field generating unit). However the mounting of a multilayer laminate on a photographic film as used in the present invention is clearly distinguishable from prior art proposals to provide photographic emulsions with layers of magnetic material spread across the emulsion. These magnetic layers of the films of the prior art are used for magnetic recording, for instance of sound, and would have been recognized by one of ordinary skill in the art as being unsuitable for use, in combination with a force-field generating apparatus, to flatten a photographic film in order to cause the image plane and the film to rigorously coincide and thereby improve the sharpness of the image: the magnetic material of the prior art is unsuitable for the purposes of the present invention because it is diaphanous and permanently in place, whereas the magnetic laminate of the invention is opaque and removed subsequent to exposure, and moreover the prior art arrangements degrade image quality both by light (i.e., the image) being scattered by the magnetic particles and by raising the fog level, whereas the present invention improves image quality without affecting fog levels. Publications disclosing such prior art combinations of film with magnetic layers include:

U.S. Pat. Nos. 3,782,947; 3,993,488; 4,279,945; 4,341,855; 5,254,449 and Canadian patent 686, 172.

It may be worthwhile to observe that what may appear to be a potential alternative way to flatten a flexible film, i.e., increasing the tension on the film, while effective where much slack is present, is intrinsically and in practice unable to fully flatten the film and indeed must always fall very short of the goal of removing film warp as a limiting factor in achieving optimal image sharpness.

Considering the efforts and resources conventionally devoted to improving the quality of film and optical components, then by removing said film warp, the present invention shall provide significant benefits by making possible in economical and practical manner substantially higher image sharpness.

SUMMARY OF THE INVENTION

It is accordingly a principal objective of the invention to provide a method and an assembly and sub-assemblies for flattening a flexible photosensitive medium, hereinafter referred to as "film", at an image area during exposure, in order to make possible uniform focusing across the image plane and optimal image sharpness, without incurring the drawbacks of prior attempts at film flattening involving pneumatic suction devices or glass plates.

This principal objective of the invention is achieved by preferred embodiments of the invention which, in their broadest aspects, involve the use of a physical force field to cause the film to be attracted in the direction of a reference-surface means and thereby be flattened against the reference-surface of said means. This reference-surface means will be the rollfilm pressure plate or the view camera's sheetfilm holder partition, and the reference surface will be that side of the rollfilm-camera pressure plate which faces the film support, i.e. the emulsion substrate, or that side of the sheetfilm holder partition facing the lens. The physical force field in the various embodiments of the invention can be either magnetic or electrical, and either static (DC) or dynamic (AC).

Broadly speaking, "flatness" in this invention denotes at least such tight hugging of the reference surface by the film that the entailed theoretical degradation in image sharpness due any remnant warp detachment shall be preferably much less than the sum of the other irreducible, degrading factors of the camera system.

In accordance with narrower aspects of the invention, a first and generally passive force-field responsive sub-assembly is temporarily affixed to an otherwise conventional rollfilm or sheetfilm and cooperates with the second, generally active sub-assembly comprising a force-field generating unit mounted in a rollfilm camera or in a sheetfilm-holder of a view camera. Herein the expression "sub-assembly" denotes substantially but not exclusively the particular functional means and also includes, where called for, accessories such as protective layers, bonding means and mounts.

In one particularly advantageous aspect of the invention, the first, film-affixed sub-assembly may be a multilayer laminate with at least one layer responsive to the force field, and in particular it may be a multi-layer laminate which includes a magnetic or dielectric layer and which may be peeled off the otherwise conventional film support before the film proper is processed.

In another preferred embodiment of the invention, a multi-layer magnetic or dielectric layer is provided in the form of a soluble matrix containing a substantially uniformly distributed magnetic or dielectric powder so that, following exposure, the matrix can be removed by dissolution from the film proper, either before or during processing.

In yet another particularly advantageous aspect of the invention, the force-field generating unit drawing the film against the film reference surface may incorporate the film reference-surface means and may be energized shortly before and, in order not to interfere with film advancement or emplacement, may be de-energized shortly after each individual picture-exposure.

In a variation of the above described embodiments, for use with a paper-backed film, a force-field booster is provided to attract the paper-backed film. In another variation of the above-described embodiments, exchangeable rollfilm pressure-plates/field-generating-units are provided, and in yet another variation, AC force-fields of an appropriate frequency are employed.

In yet another variation of the above described embodiments, a control unit drives the force-field in relation to film advance and exposure.

Further details and variations of the invention are elucidated below in relation to the drawings.

BRIEF DESCRIPTION OF THE DRAWINGS

All Figures are diagrammatic and where appropriate certain components therein are exaggerated in size for clarity of exposition.

FIGS. 2a, 2a', 2b and 2c are cross-sections of illustratively rollfilm force-field generating magnetic-units/pressure-plates representing as a rule second force-field generating sub-assemblies of the invention for cooperation with the films, i.e. the first force-field responsive sub-assemblies, shown in FIGS. 1, 1a, 1a', 1a", 1b and 1c.

DETAILED DESCRIPTION OF THE PREFERRED EMBODIMENTS

In the description below, even though they share common principles, rollfilm assemblies and sheetfilm assemblies are nevertheless described separately for greater clarity of exposition. The expression "rollfilm camera" in some instances also covers "view cameras" when the latter, in lieu of their conventional sheetfilm holders, are loaded with rollfilm adapters.

Where further below application of a rollfilm embodiment to a sheetfilm embodiment or vice-versa is obvious to one skilled in the art, needless repetition will be avoided by pointing out the said applicability to the other version at the appropriate place.

Figure 3D:
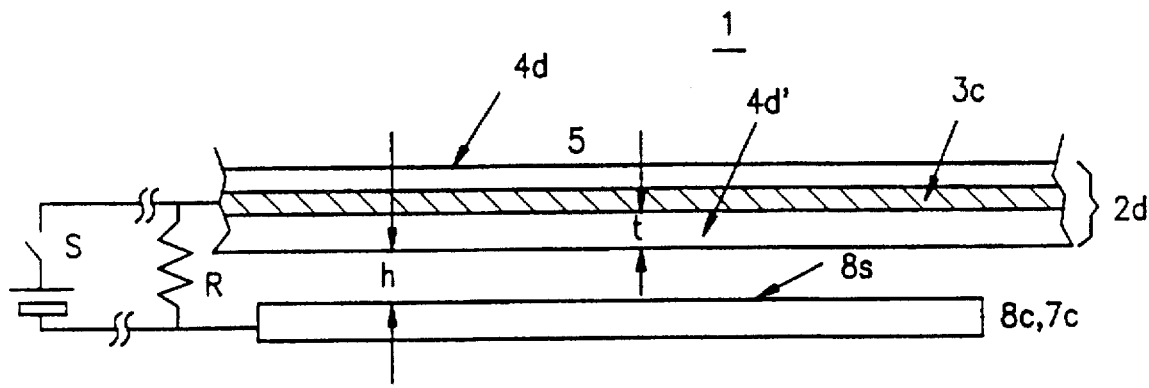
FIG. 3d shows a preferred embodiment of the invention composed of an electric, parallel-plate capacitor assembly.
Figure 3A:
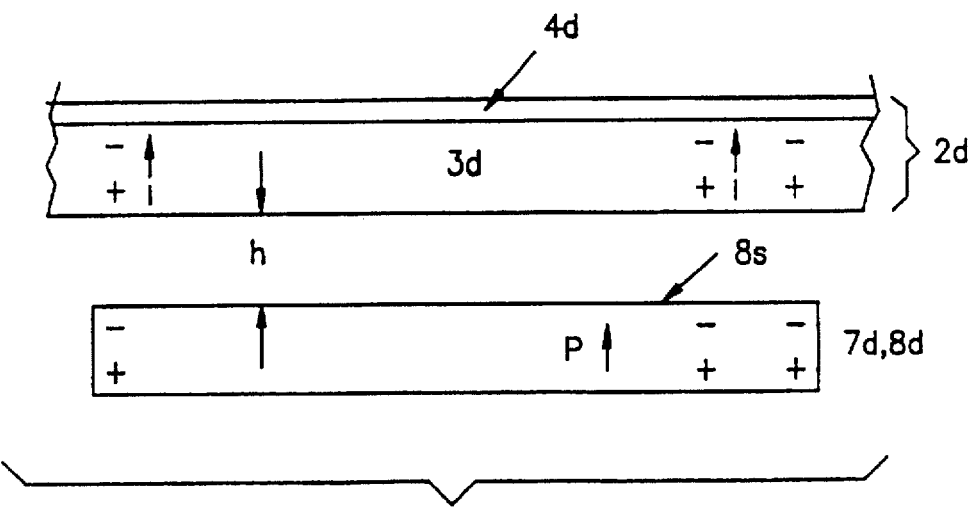
FIG. 3a shows a preferred embodiment with dielectric sub-assemblies.
Figure 3B:
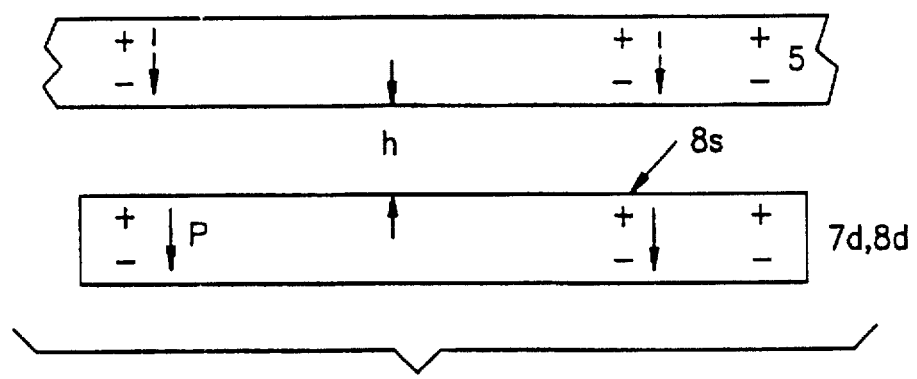
FIG. 3b shows a preferred embodiment in which a permanently polarized film reference-surface means attracts the conventional film support.
Figure 3C:
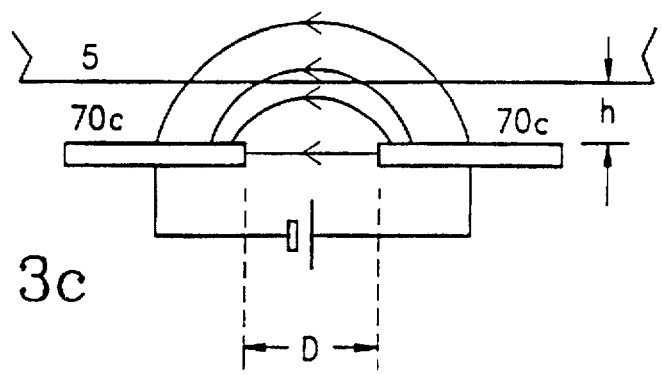
FIGS. 3c, 3c' show a preferred embodiment of the invention in which a conventional film support is attracted using DC or AC electric fields.
Figure 3C:
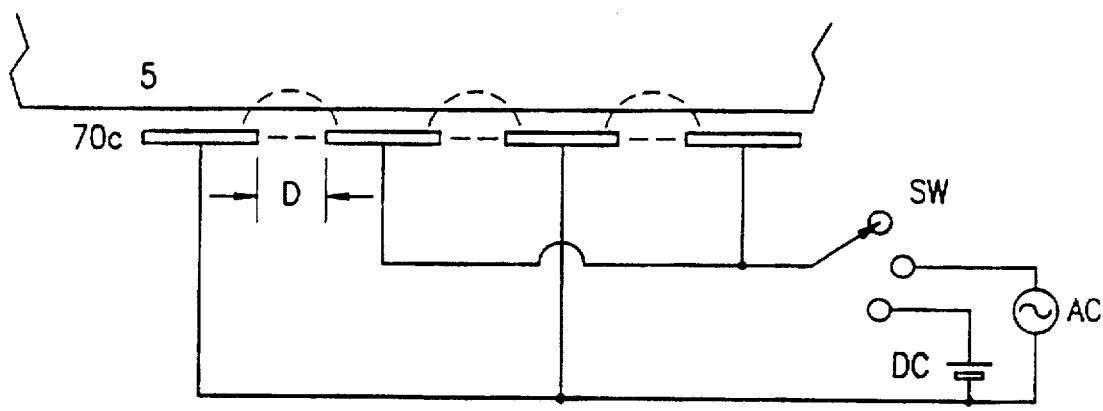
Figure 4:
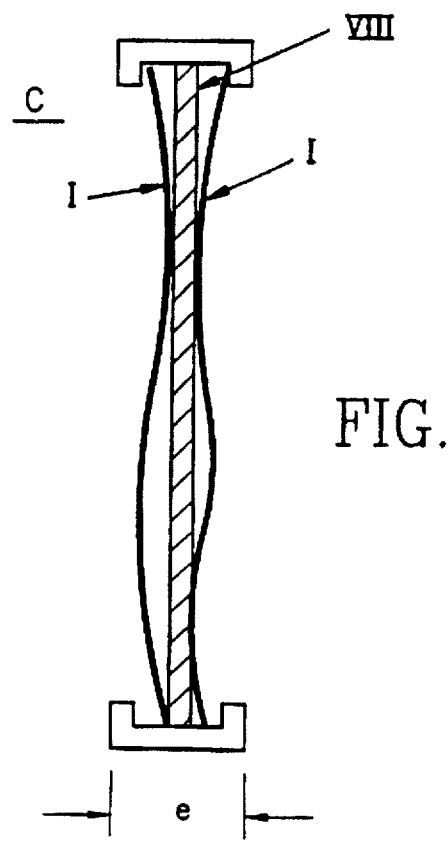
FIGS. 4, 4a, 4b, 4c, 4d and 4d' are cross-sections of, respectively, a schematic conventional sheetfilm-holder and five modified sheetfilm holders according to preferred embodiments of the invention.
Figure 4B:
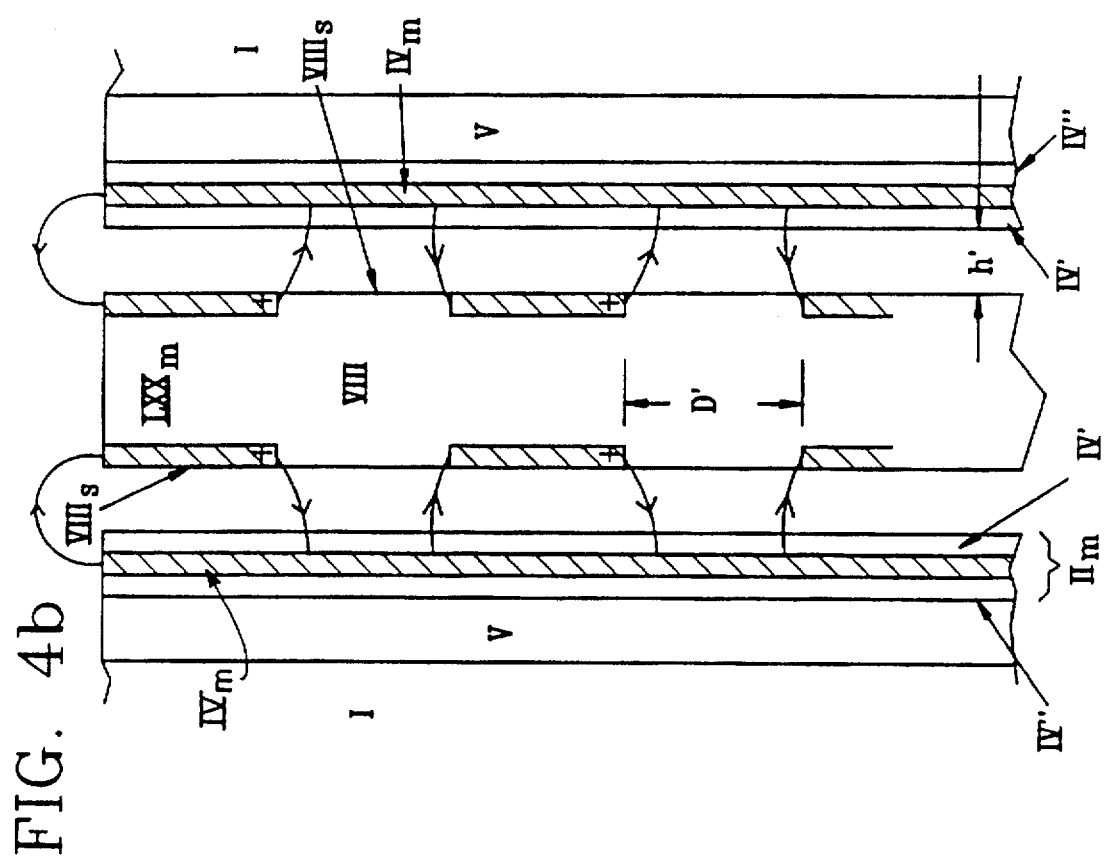
Figure 4A:
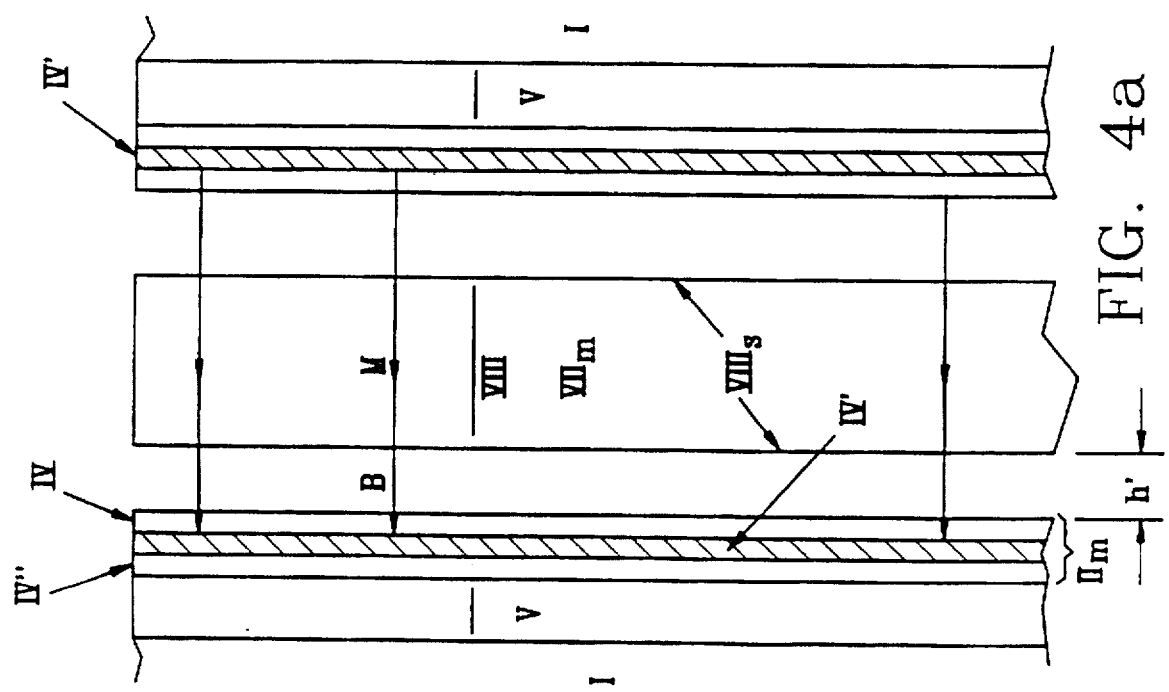
Figure 4C:
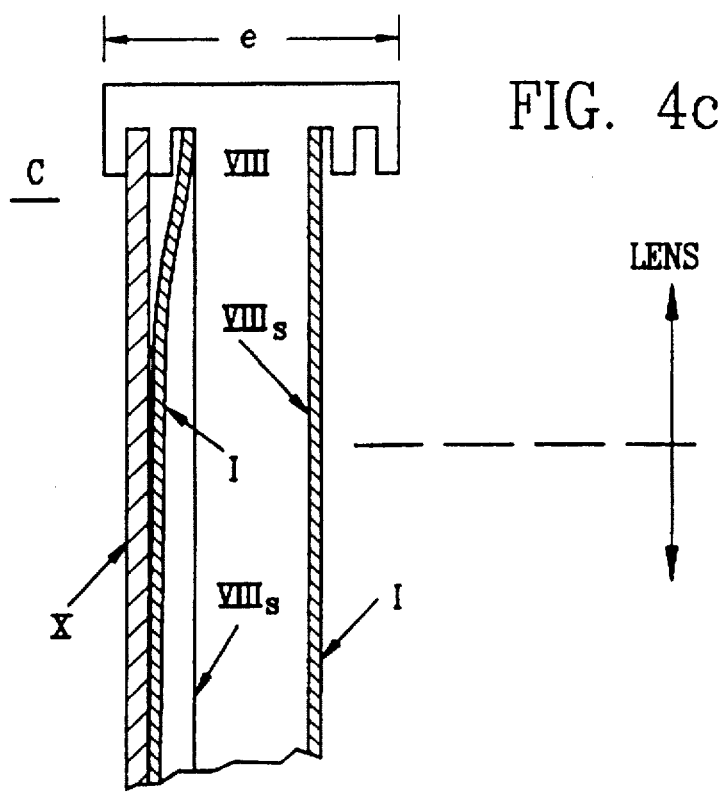
Figure 4D:
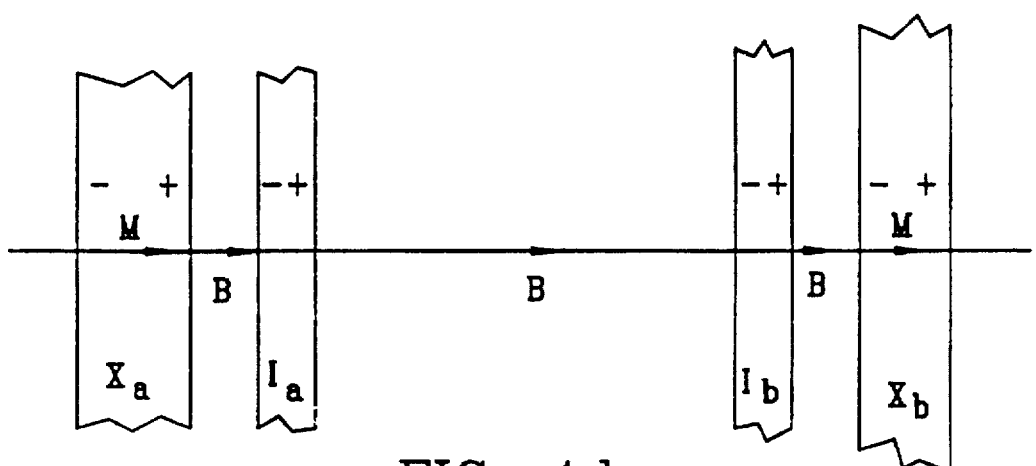
Figure 4D:
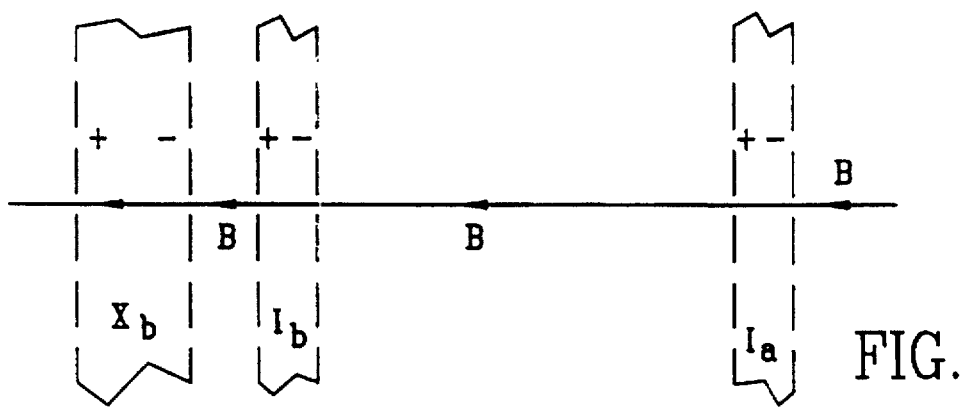

Predominantly FIGS. 1a through 3b relate to the rollfilm-camera assemblies and FIGS. 4 through 4d' to the sheetfilm-camera assemblies. FIGS. 1, 3a through 3d, and 5 through 8 may be applied to both.

In all cases the Figures below show certain components qualified by suffixes "m" and "d" or "M" and "D" depending on the embodiment or variation thereof. The suffix "m" denotes "magnetic", whether hard, soft or electromagnetic. The suffix "d" denotes "dielectric" (i.e., a material across which an electric field, including a DC field or a low-frequency AC field, can be induced) and may also relate to low-hysteresis dielectrics or to a ferroelectric material. In a special case, namely that of the parallel-plate capacitor, some suffixes are changed to "c" to denote electrical conductivity. The capitalized suffixes M, D refer to a functional interchange of the heretofore first, passive and second, active subassemblies, as will be explained below. The joint notation of the suffixes "m", "d" in the Figures indicates that the particular configuration denoted thereby is applicable substantially in both the "m" and "d" modes, even though for brevity only one mode may be discussed in relation to a particular Figure.

Unless and until specifically so noted, the discussed films are assumed free of paper-backing. Where paper-backing is present, such a configuration shall be explicitly so stated.

The following discussion of the many preferred embodiments of the invention is compartmentalized for the sake of overview, to the extent practical, into several subsets each with a salient feature. Broadly, such salient features for instance are rollfilm cameras or sheetfilm cameras, AC or DC operation, and various idiosyncratic variations.

A. Rollfilm-Camera Assemblies

Figure 1:
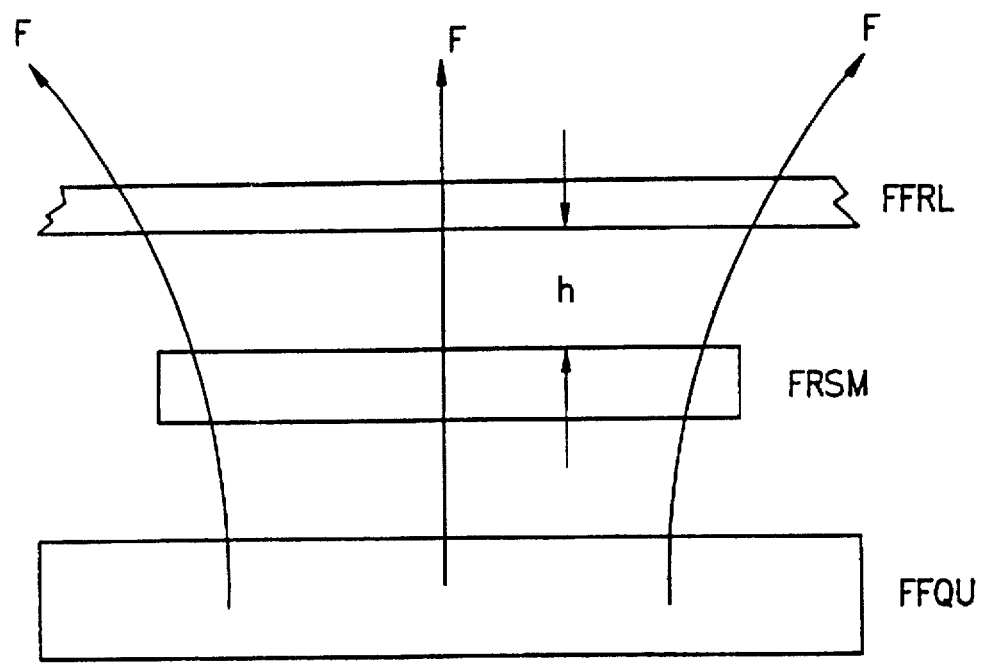
FIG. 1 is a schematic diagram illustrating the principles of a preferred embodiment of the invention.

FIG. 1 is a block diagram of a first preferred embodiment of the invention composed of first and second sub-assemblies resp. denoted FFRL and FFGU positioned on opposite sides of a film reference surface means FRSM. As illustrated, the sub-assembly FFRL, i.e. the first, generally passive force-field responsive sub-assembly, may be an otherwise conventional photographic film fitted with a force-field responsive laminate shown a warp-gap h above the film reference surface means, i.e. its reference surface, toward which it is attracted by said force field. The laminate of the invention preferably remains only affixed to the otherwise conventional film till the exposure of the film is complete, in general until processing. Before or during processing, the laminate is removed, for example by being peeled off or by being dissolved.

The second, generally active sub-assembly FFGU comprises a force-field generating unit which generates an attractive field generically denoted by the field lines F.

FIG. 1a symbolically shows a lens with its dashed-line optic axis perpendicular to a partly conventional photographic rollfilm 1. The suffixes m, d indicate that an embodiment is implementable in both magnetic and dielectric versions, even though only one (usually the magnetic one) is being discussed for the sake of brevity. Rollfilm 1 includes a conventional support, i.e. an emulsion-substrate 5 and is fitted with a multi-layer magnetic laminate 2m constituting the first sub-assembly of the invention. R denotes the direction of film advance. Laminate 2m includes a magnetic force-field responsive layer 3m which responds to fields generated by permanent or electro magnets composing the second sub-assembly. Layer 3m is fitted on one side with a layer 4 detachably bonding the laminate 2m to the support 5 and on the other side with an optional layer 4'. In a variation of this embodiment, the layer 4 is both the bonding agent and the antihalation layer for the film.

Where used, the layer 4' of FIG. 1a protects the emulsion of the rollfilm when in its wound state (or the emulsion of the sheetfilm when in its stacked state). Preferably, layer 4' is a low-friction material such as Teflon™ to enhance smooth film-advance or emplacement. In the event the film 1 fitted with laminate 2m is furthermore backed with an unbonded paper backing, as is the case with 120 format film, this unbonded paper backing will be the layer 4'.

In order to permit conventional film processing, the multi-layer magnetic laminate 2m is removed after exposure, but before or no later than processing proper. The thickness of the multi-layer magnetic laminate 2m preferably is small compared to that of the conventional support 5 and, perforce, each constituent layer of the laminate 2m (except when 4' is paper backing) must be thin. The soft-magnetic layer 3m may consist either of a thin foil or of a powder.

FIG. 1a' is a top view of a modified multi-layer magnetic laminate 2m which in this instance also is assumed to be fitted with the above layers 4 and 4', with layer 4 being considered transparent for simplicity of discussion. Whereas in FIG. 1a the soft-magnetic foil is assumed continuous from at least the first rollfilm image frame to at least the very last, in this embodiment it is localized into recurring strips 30m running transversely to the direction of film advance R and of short length s in this direction of film advance, being mutually spaced apart by a distance D. In general several such strips and in-between gaps shall be present within the image frame. Magnetic material is saved thereby and the film 1, if a rollfilm, furthermore is rendered more pliant.

FIG. 1a" shows another distribution of the force-field responsive material, this new distribution again providing material economy. In practice, each element may be a figure of plane geometry, for instance a polygon, or figures of analytical geometry such as ellipses or parabolas, hyperbolas etc. In another variation, the elements may be random shapes randomly arrayed, provided that they are always near enough to one another, and the film rigid enough, that the energization-inert gaps between said elements cannot buckle, and thus are flattened as much as the energized zones.

It is noted that while embodiments such as the ones illustrated in FIGS. 1a' and 1a" save magnetic material, they also entail tradeoffs, in particular with respect to attraction, which are advantageously optimized empirically. In tests run by the inventor, conventional film, if held down at two spots 1 cm apart, is rigid enough not to detach in-between.

The force-field responsive sub-assembly described above, namely a laminate such as shown in FIGS. 1a, 1a'and 1a", also may comprise more than 1, namely n force-field responsive layers $3m'$ . . . $3m^n$, $3d'$ . . . $3d^n$ with n=1, 2 . . . Accordingly the embodiment of FIGS. 1a–1a"is a special case with n=1. The case for n=2 is illustrated in FIG. 1b.

Figure 1B:
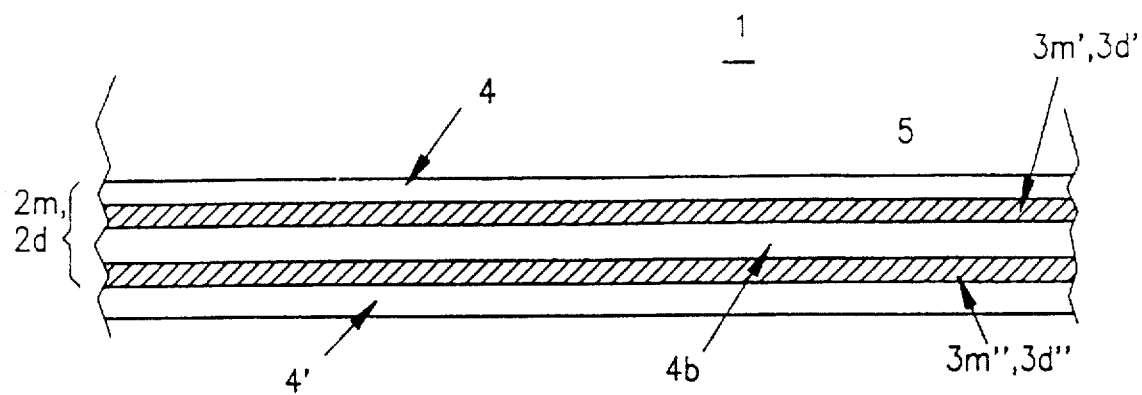
FIGS. 1a, 1a', 1a", 1b and 1c are, respectively, a cross-section, two top views and two cross-sections of a film which includes magnetic or dielectric multi-layer laminates representing as a rule first force-field responsive sub-assemblies of the invention constructed according to the principles of preferred embodiments of the invention.

In FIG. 1b, the laminate still denoted by 2m, 2d, regardless of the value of n, and with the bonding layer 4 of FIG. 1a, now comprises two force-field responsive layers, namely $3m'$, $3d'$ and $3m"$, $3d"$ which are kept apart by a non-responsive or less responsive layer 4b. (Thus, as regards the dielectric version of FIG. 1b, the layer 4b would be of substantially lower dielectric permittivity than the layers $3d"$ and $3d"$). A protective layer such as layer 4' with or without an antihalation agent may be added to the laminate 2m, 2d at its base as called for.

While in some instances as well as in rigorous principle the lower of the two field-responsive layers, namely $3m"$, $3d"$ must be field-saturated before the upper one, namely $3m'$, $3d'$ can respond, in practice the applied force-field is likely always to be sufficient even for n >2 such layers.

Those skilled in the an are well able to apply the Example of FIG. 1b to the cases of n>2. They are also well able to apply the disclosure relating to FIGS. 1a' and 1a'to the embodiments comprising $3m'$ . . . $3m^n$; $3d'$ . . . $3d^n$ force-field responsive layers. Therefore repeated discussion of these cases is not necessary.

Figure 1C:
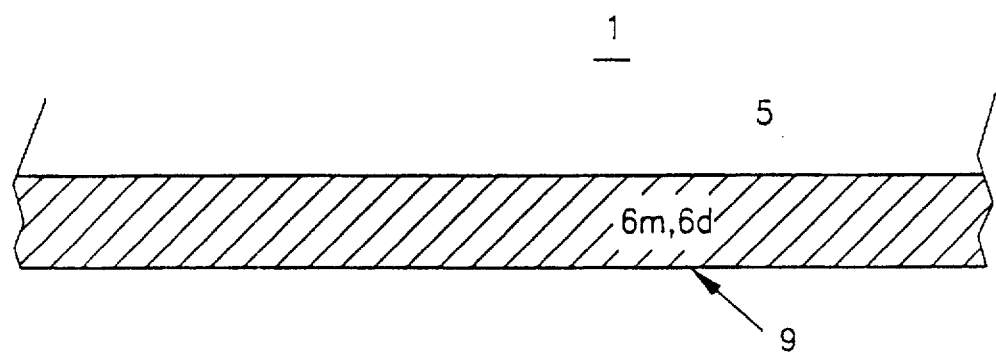

In another embodiment, shown in FIG. 1c, a matrix 6m which holds a magnetic powder is affixed to an otherwise conventional film 1 with support 5. In this example, the matrix 6m by its very nature holds well dispersed magnetic powder packed densely enough to be equivalent in mass, at least by the same order of magnitude, to the continuous, solid magnetic layers 3m discussed above. Where desirable, matrix 6m may be fitted with thin protective foils (not shown) at its top surface and its bottom surface 9, although preferably the surface 9 shall be smooth enough by itself to optically affect neither the base of the support 5 nor, in the stored-film condition, the top of the emulsion (not shown). This matrix 6m also as a rule is thin compared to the film 1. In one variation this matrix 6m is peelable from the otherwise conventional film 1 in the manner of the above described laminate 2m. In another variation, however, the matrix 6 is soluble, in particular in water, or in another specific solvent, to allow its removal by dissolution before and/or during film-processing proper.

In a variation of the above-described embodiments, instead of the force-field responsive elements having the form of planar elements with their planes parallel to the film plane, if these force-field elements are in the form of sufficiently narrow flakes, they may slant by their planes relative to the film plane at any (absolute) angle between 0° and 90°.

Although most of the above embodiments of FIGS. 1 through 1c were described in the context of magnetic materials, those skilled in the art will appreciate that the principles involved also apply in kindred manner to the electric force field embodiment.

FIGS. 2a, 2a' and 2b show preferred embodiment modes of the assemblies of the invention which generally comprise such first sub-assemblies as mentioned above in relation to FIGS. 1 through 1c, and second sub-assemblies which generally comprise the force-field generating units acting on said first sub-assemblies. FIG. 2c symbolically shows an electromagnetic force-field generating unit.

These first and second sub-assemblies of the invention are shown or assumed in FIGS. 2a, 2a' and 2b (furthermore in other drawings yet to be discussed) being separated from the reference surface 8s by a uniform warp-gap h. The gap h is shown uniform for simplicity of elucidation and because such simplicity does not affect the objects of discussion.

FIGS. 2a, 2a' and 2b will be discussed only for the magnetic embodiment of the other, i.e. the second sub-assembly of the invention, comprising the force-field generating unit. Electric embodiments are discussed below in relation to FIGS. 3a, 3b, 3c, 3c' and 3d.

FIG. 2a shows a cross-section of a simplified assembly of the invention, namely on one hand a first, passive sub-assembly in the form of a laminate 2m (assumed affixed to an omitted film support) and here shown consisting of a force-field responsive magnetic layer 3m protected by an optional protective layer 4', and on the other hand a second, active subassembly in the form of a magnetic reference-surface means 8m with reference surface 8s, which is also the force-field generating unit 7m in the form of a magnet. The magnet 7m is assumed permanent and is magnetized (M) perpendicularly to its own plane and to that of the rollfilm laminate 2m above it. The film detachment, i.e. the warp, is symbolically denoted in much exaggerated form by h and the induction vector is shown by B.

The configuration of FIG. 2a' is similar to the configuration of FIG. 2a, except that herein the magnetization M of the magnetic force-field generating-unit/pressure-plate 7m, 8m is in a plane parallel to the layer 3m, and in this instance is antiparallel to the direction of film advance R. While most of the flux passes from, and into, the left and right ends, respectively, of the magnetic force-field generating-unit/pressure-plate 7m, 8m, a non-negligible portion also jumps directly from the upper surface of the magnetic force-field generating-unit/pressure-plate toward the layer 3m where it is shunted, as indicated by the central arc.

FIG. 2b shows another embodiment of the invention in which a non-magnetic pressure plate 8 acting as the reference-surface means with a reference surface 8s also serves as the mount for the force-field generating unit, which in this case is composed of magnetic elements affixed to its underside. As before, a laminate with a soft-magnetic layer 3m is shown a warp gap h above the reference surface 8s.

In FIG. 2b, a number of permanent magnet elements, of which only two are shown, are mounted to the bottom of the pressure plate 8 (illustrated as strips 70m running by their lengths transversely to the direction of film advance R) and are spaced apart between their adjacent poles of opposite signs by a distance D large enough that the fluxes from the mutually facing (+) and (−) poles across this gap D link only slightly with each other while being each substantially shunted by the layer 3m, and thus they substantially close each one on its own magnet. Because the warp gap h <<D, the individual hard-magnetic strips can be positioned relatively close together, and if there are N such magnet strips, the attraction per unit area will be due to N sets of ± poles, plus the attraction due to local "leakage" from the strip, instead of being due the single set of ± poles (plus leakage) of FIG. 2a. Therefore the attraction will be larger than produced by a single strip 70m the size of the pressure plate 8m of the embodiment of FIG. 2a'. In a variation of the embodiment of FIG. 2b not shown in the drawings, the adjacent poles of the magnet strips 70m are of the same polarity and the gap D may thereby be made smaller yet.

In a variation, the spaced strips 70m, instead of running transversely to the direction of advance R, will be running parallel to it.

In another variation, not shown, the strips 70m of FIG. 2b are magnetized in either of the two directions perpendicular to the film plane, that is, either up or down.

Each permanent magnet 7m, 70m shown in FIGS. 2a, 2a', 2b may be replaced by an electromagnet illustratively of approximately the same general geometry and symbolically shown in FIG. 2c. In this particular embodiment, the electromagnet is magnetized in the direction parallel to the film, with wires carrying a current I flowing into the viewed plane of the drawing (in top wires) and coming out of it again (in bottom wires). Such electromagnets may operate in a DC mode or in an AC mode at a suitable frequency. Electromagnets are well known to those skilled in the art and require no functional elucidation here.

In a variation (not shown), the magnet strips 70m may be replaced by permanent magnets of various regular contours or random contours and arrayed in other geometric or random patterns provided said permanent magnets be everywhere sufficiently spaced apart from their nearest neighbors that their own flux preferentially passes through the force-field responsive layer(s) of the laminate.

While the above second, active sub-assemblies of the invention in the form of said force-field generating units 7m, 70m were illustrated as being integrated into the pressure plate itself or being elements affixed to it, they also may be mounted elsewhere, for instance to the camera back cover, provided they remain near enough the laminate 2m.

FIGS. 3a–3d show dielectric embodiments. FIGS. 3a–3c show embodiments substantially similar to the above magnetic versions. FIG. 3d' shows the special case of the parallel-plate capacitor assembly.

FIG. 3a shows a dielectric configuration of a first and second pair of sub-assemblies for flattening a film against a reference surface. In this case, the first, passive sub-assembly, namely the laminate 2d, includes a bonding layer 4d with or without an antihalation agent and a dielectric layer 3d. The second, active sub-assembly 7d, 8d is again illustrated as being the reference-surface means 8d with reference surface 8s and is a dielectric having a polarization (P) as indicated by the solid lines. When the reference-surface means 7d is a ferroelectric polarized in the direction indicated, and the layer 3d is a soft dielectric, induced polarization will take place in the layer 3d as indicated by the dashed lines and will be attractive. A comparatively thin film (not shown) of low-friction plastic such as Teflon™ may be deposited on either or both of the mutually facing surfaces of the layer 3d and of the reference-surface means 8d.

FIG. 3b shows an especially simple embodiment of the invention in which the conventional photographic film is entirely unmodified if lacking paper-backing, or in which, if the film is paper-backed as is the case with 120 format film, the paper-backing preferably, but not mandatorily, is removed. In this embodiment, the assembly of the invention is reduced to a single sub-assembly, namely the electric force-field generating unit which may, for example, be in the form of a film reference-surface means 7d, 8d with reference surface 8s and is composed of a permanently polarized dielectric of which the polarization vector, shown in solid lines, induces polarization, shown in dashed lines, in the support 5, and thereby causes attraction.

FIG. 3c shows an embodiment of an assembly of the invention in which the film support 5 is immersed in and attracted by the electric field from a force-field generating unit a warp-distance h below and which in this instance is a pair of coplanar, electrically conducting strips 70c separated in their plane by a non-conducting gap D. One strip 70c is connected to the positive terminal of a DC power source and the other strip 70c to the negative terminal. For clarity the lower field lines were omitted from FIG. 3c. The strips 70c are affixed in the vicinity of, near or in the film reference surface (not shown in this figure), which of course must be electrically non conductive or insulated from the strips 70c.

FIG. 3c' shows an embodiment kindred to that of FIG. 3c but illustratively with 4 strips 70c, which are alternatingly connected to the same terminal of a power source, and selectively to DC or AC through a switch SW when energized. The field lines between the strips are then as indicated by the dashed lines (the lower field lines being omitted for clarity). It is clear per se that the strips 70c may be a total of N, with N/2 alternating strips 70c in parallel and connected to one terminal, and the remaining alternating N/2 strips also in parallel and connected to the other terminal of either source when energized, and hence that N preferably shall be even. Be it noted that AC operation is possible deep into the ultrasonic range.

FIG. 3d shows an assembly of the invention amounting to a parallel-plate capacitor wherein one plate is part of an aforementioned laminate and the other plate is part of an aforementioned reference-surface means. In this embodiment therefore the two cooperating sub-assemblies may be construed being both active and acting on, and reacting to, each other.

The two plates of FIG. 3d are energized from a DC source E through a switch S, an optional discharge resistor R being provided. When the film is pressed against the reference surface, that is when the warp gap h vanishes, the thickness t of the layer 4d' prevents both shorting the two plates and also dielectric breakdown of this layer 4d'. In a variation of the invention, the source E is AC of an appropriate frequency.

In another embodiment (not shown), the bonding layer 4, 4d of the various above rollfilm-camera embodiments, as well as the yet to be discussed bonding layer IV" of the sheetfilm-camera embodiments below, is a polarized ferroelectric to induce polarization in the support 5, itself a dielectric, and thereby said polarized ferroelectric may also achieve bonding between the laminate 2m, 2d and the film support 5.

In particular with respect to the embodiments of FIGS. 3c–3d, it is clear they also are applicable to sheetfilm cameras.

It should be understood by those skilled in the art that in all of the above-discussed embodiments of the laminates of the invention, the laminates are affixed to the otherwise conventional film during exposure and are subsequently removed, before or during processing, to allow printing.

B. Sheetfilm-Camera Assemblies

In variations of the preferred embodiments described above relating to the rollfilm-camera assemblies, the principles of the embodiments shown in FIGS. 1 through 3d' also apply to sheetfilm camera assemblies.

In the following specific discussion of sheetfilm and sheetfilm holders, Roman numerals are used for the component references to emphasize the distinction relative to rollfilm embodiments.

FIG. 4 is a vertical and schematic cutaway cross-section of a conventional sheetfilm-holder C loaded with film I on both sides. The (unreferenced) peripheral guides are only indicated at the top and bottom as holding the warped sheetfilm, of which the detachment from the partition VIII is much exaggerated. The significance of the sheetfilm-holder width "e" arises from the incremental film thickness caused by the additional force-field responsive laminate of the invention, and will be briefly considered further below.

FIG. 4a is another vertical cross-section schematically showing a cutaway of the second sub-assembly of the invention composed of the force-field generating unit, in this instance the partition VIII of a sheetfilm holder loaded left and right with sheetfilm I comprising the first force-field responsive sub-assembly of the invention. In this embodiment the partition VIII itself is the permanent magnet VIIm which is magnetized, as indicated by M and which generates the induction vector B perpendicular to the plane of the film I, of which the support V in turn is fitted with the said force-field responsive sub-assembly of the invention, i.e. the multi-layer magnetic laminate IIm. Both sheetfilms I therefore will be attracted against the reference surface VIIIs. Except for the magnetic force-field generating-unit/sheetfilm-holder C now magnetizing two films instead of one, the same considerations that were raised in relation to FIG. 2a concerning rollfilms apply to this embodiment, including the possibility of AC operation. The layer IV" may be the bonding layer per se or it may be a bonding layer combined with an antihalation layer. Preferably the optional layer IV is made of a low-friction material such as Teflon™. The field-responsive layers are denoted by IVm' and the warp gap is symbolically denoted by h'.

It is clear that the configuration of FIG. 4a also is practical for the dielectric case, by replacing the magnetic layers IVm with dielectric layers IVd and by replacing the magnetic partition VIIm with a polarized ferroelectric partition VIId.

FIG. 4b cross-sectionally shows another illustrative embodiment of a sheetfilm-holder partition VIII representing the second force-field generating sub-assembly wherein permanent magnet elements, i.e., strips LXXm, which are magnetized parallel to the partition VIII, are imbedded symmetrically and with the same polarities on each side of partition VIII and a distance D' apart on each surface VIIIs which is substantially larger than the distance from a magnet pole to the magnetic film layer IVm of the invention. The multi-layer magnetic film laminate IIm representing the first, force-field responsive sub-assembly is composed in this instance of an optional protective layer IV', of the field-responsive layer IVm and of a bonding/antihalation layer IV". Aside the particular geometry of the sheetfilm-holder partition, the same principles apply here as to the embodiment of FIG. 2b, including the possibility of AC operation.

In a variation of the preceding embodiment, the magnet strips LXXm at each surface of FIG. 4b may be arranged adjoining by their poles of the same polarity but not touching each other. Furthermore, the magnet strips LXXm shown in FIG. 4b may be mounted on the surface of the smooth partition serving as the reference-surface means, instead of being imbedded in it, in which event however the gaps D' between them, if comparably large, for instance if more than a few mm, must be filled-up to provide a sufficiently smooth and sustaining reference surface. The layer IV" again may be a mere bonding layer or it may be combined with an antihalation agent. Those skilled in the art should note that the elements LXXm are shown symbolically and may assume other geometric shapes or even be randomly shaped, and that the gaps D' then shall commensurately match the particular elements.

In a variation (not shown) of the embodiment of FIG. 4b, the strips LXXm are magnetized in reinforcing directions perpendicularly to the plane of the partition VIII.

The configuration of FIG. 4b may be used for the dielectric case by replacing the magnetic layers IVm with dielectric layers IVd and by retaining the structures of the elements LXXm but replacing the magnetic material with a polarized ferroelectric material to form elements LXXd, of which the polarization vector is perpendicular in either direction to the plane of the dielectric layers IVd.

FIG. 4c is a cross-sectional cutaway of another embodiment of the assembly of the invention in the form of a different sheetfilm-holder. In this embodiment the sheetfilm I also comprises a force-field responsive sub-assembly in the form of an affixed laminate IIm of the invention and of the kind already discussed above. But the second sub-assembly comprising the force-field generating unit, instead of being integrated into the partition VIII, now is embodied in each film-mask X. In FIG. 4c, one film-mask X is shown on the left, whereas the other, belonging to the right side, was removed for picture taking. During this exposure, the films are attracted in the manner indicated, namely film I on the right of the partition VIII, while being exposed, is flattened against its reference surface VIIIs by the magnetized film-mask X on the left. Said film mask X further acts on, and also pulls the light-protected film I on the left, which thereby buckles as indicated, but only when it is the film which is AWAY from the lens. Whichever film faces the lens will be flattened against the reference surface VIIIs as shown. In some instances, however, remanence in said laminates might become bothersome when picture taking. To obviate such an eventuality, the invention takes further steps:

In order to always secure the proper and mutual direction of magnetization of FIG. 4d, as assumed being the case just before the exposure of the film $I_b$, the invention calls not only for the film-masks X per se being magnetized in the proper directions, for instance, in the case of FIG. 4d, inwardly for film-mask $X_a$ and outwardly for film-mask $X_b$, but furthermore that they be each mutually keyed, for instance mechanically, with their sheetfilm holder for insertion into latter in such manner that all the polarities indicated in FIG. 4d', which is assumed the case after said exposure of film $I_b$ and now being the exposure of film $I_a$, will always be automatically observed. In addition, it is preferred that the film-masks X be coated on their film-facing sides with a thin, low-friction film.

C. DC/AC Embodiments

Regardless of the above assemblies of the invention relating to rollfilm or sheetfilm cameras, their force-fields need not be permanent as from permanent magnets, indeed they may also be generated by electromagnets as in the already discussed embodiment of FIG. 2c, or they may be generated from electric force-field generating units, as already discussed in the embodiments relating to FIGS. 3c and 3c'.

Force-fields applied from controlled power sources offer finer control of the interaction between the sub-assemblies. Illustratively a time interval of attraction for picture-taking may be followed by another time interval of slight repulsion to facilitate illustrativbely roll-film advance, or controlled decay of AC-generated attraction following picture taking may be used (automatically) to demagnetize for instance the force-field responsive layer so that the exposed and wound-up turns of the rollfilm are safe from clinging to one another.

Such intermittently applied, power-source generated force-fields thus may be DC or AC, and furthermore they may be applied in some sequence over given time intervals related to picture taking.

Figure 5:
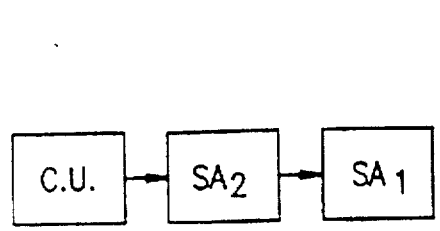
FIG. 5 shows a functional block diagram of embodiments outlined in FIGS. 5a and 5b for controlled and timed force-field generation.

FIG. 5 shows a functional block diagram of an embodiment of the invention wherein a control and timing unit CU drives a second, namely force-field generating sub-assembly $SA_2$ which in turn acts on a first, namely force-responsive sub-assembly $SA_1$. The said second and first sub-assemblies are among those already discussed above and need not be discussed again. The control and timing unit is outside the scope of the present invention but easily available.

Figure 5A:
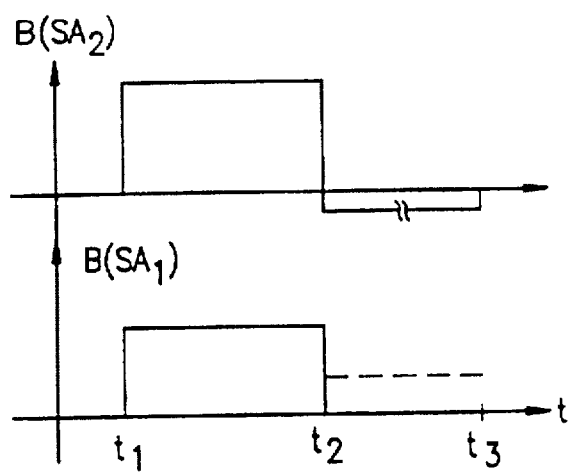

FIG. 5a shows the operation of an embodiment of the invention comprising an illustratively magnetic assembly $SA_2$, $SA_1$ driven by the control and timing unit CU of FIG. 5. In this case a DC power source drives the force-field generating unit $SA_2$ to a positive value of B, being turned on at time $t_1$, for instance the beginning of exposure, till time $t_2$, for instance the end of exposure. At time $t_2$, the power source is not only turned off, it slightly reverses to generate a small negative value of B until time $t_3$ which precedes the next picture-taking.

Simultaneously, as shown below by $B(SA_1)$, the force-field responsive sub-assembly $SA_1$ is magnetized to a positive value of B between $t_1$ and $t_2$ at which time, even with a fairly soft material, some positive remanence may linger as indicated in dashed lines even though the initial force-field between $t_1$ and $t_2$ was shut off and moreover slightly reversed.

Because attraction was produced during exposure when both fields $B(SA_2)$ and $B(SA_1)$ of FIG. 5a were positive between $t_1$ and $t_2$, their relative reversal in the time interval $t_2$–$t_3$ entails repulsion. The magnitude of the reversed field $B(SA_2)$ preferably shall be small or even less than that of the remanent field in $B(SA_1)$ so that the former does not override the latter.

The time $t_3$ in FIG. 5a is that at which the layer with remanent $B(SA_1)$ has moved substantially out of reach of the force-field with $B(SA_1)$.

Figure 5B:
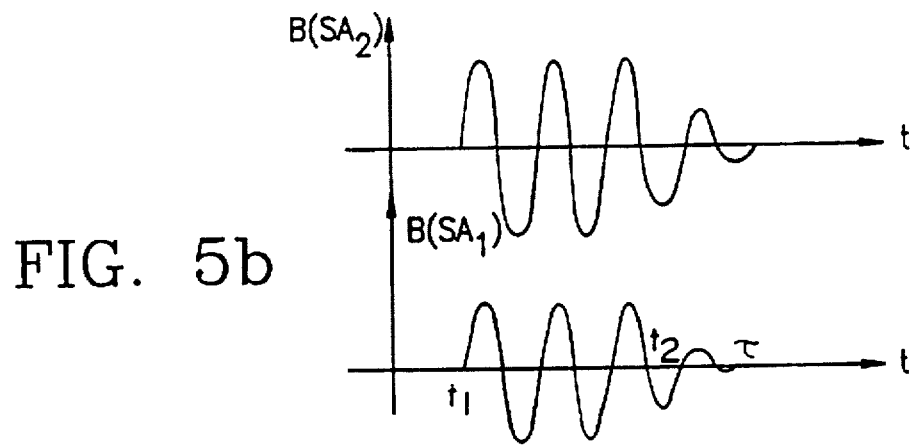

FIG. 5b shows an embodiment of the invention similar to that of FIG. 5a but wherein the force field is AC. For clarity of illustration, only a few cycles are indicated, while in practice they would be many; also hysteresis effects in the lower curve $B(SA_1)$ are neglected.

In the embodiment of the invention shown in FIG. 5b, the AC force-field $B(SA_2)$ again is applied at constant amplitude over a time interval $t_1$–$t_2$ corresponding to exposure, but thereafter the amplitude is made to decay over a number of cycles. Because of the alternation of directions and the controlled decay of amplitude after time $t_2$, the force-field responsive layer in which $B(SA_1)$—shown without hysteresis for simplicity—was induced is now demagnetized so that at time τ any remanent magnetization will be negligible. Be it noted that AC operation is feasible deep into ultrasonics.

The above DC/AC operation also applies to the dielectric versions. Thus FIG. 5 relates to all magnetic and dielectric versions in a general way. More particularly, besides the magnetic embodiments discussed above in relation to FIGS. 5a, 5b, the fields $B(SA_2)$ and $B(SA_1)$ can be replaced by their electric counterparts $D(SA_2)$ and $D(SA_1)$, with $D=\epsilon \xi$, ($\xi$=volt/m). Thus the principles outlined in FIGS. 5–5b can be applied for instance to the earlier configurations of FIGS. 3a, 3c, 3c' and 3d. Said principles, already having been discussed for the magnetic versions above, need not be repeated therefore for the dielectric case.

The limits of AC operation are set by hysteresis and eddy-current power losses in the magnetic case and corresponding losses in the dielectric case. However, the hysteresis-affected volumes of the preferred first and second sub-assemblies of the invention are slight, and hence hysteresis losses are small and eddy currents may be minimized by well known techniques where deemed necessary. The problem of hysteresis is further alleviated by the fact that camera use is highly intermittent. Finally, those skilled in the art will appreciate that AC operation may be extended well into the ultrasonic range.

D. Other Assembly Embodiments

In addition to the embodiments of the invention described so far, which—except for the case of the parallel-capacitor and the case of the conventional film-support being the force-field responsive sub-assembly—each consist of an assembly comprising one passive, force-field responsive sub-assembly of the invention acted on by another, active force-field generating sub-assembly of the invention, this invention furthermore encompasses a number of significant variations wherein for instance the above first and second sub-assemblies interchange their functions, or both sub-assemblies are active and act and react on and to each other.

Figure 6:
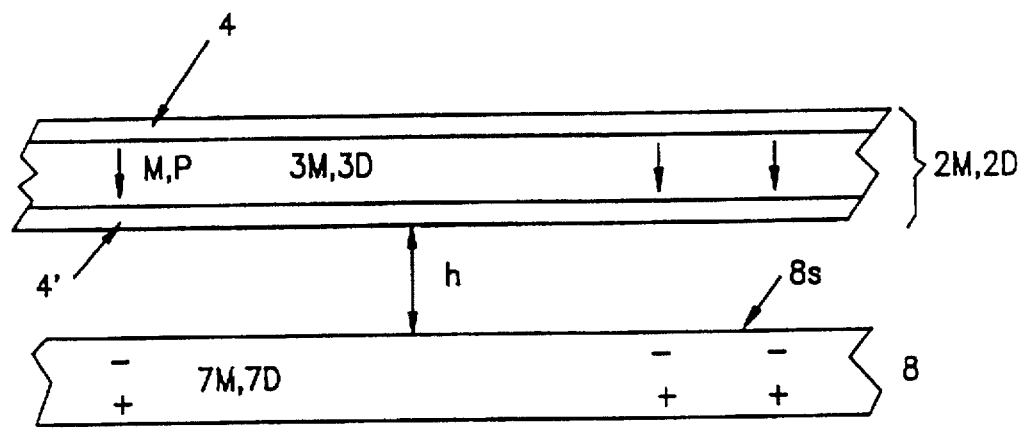
FIG. 6 shows a preferred embodiment of the invention in which the previous first and second sub-assemblies interchange their functions.

FIG. 6 symbolically shows one of such latter embodiments wherein the functions of the heretofore discussed sub-assemblies are interchanged. To call attention to such inversion, capitalized suffixes are used.

In FIG. 6, the first sub-assembly, namely the laminate 2M, 2D is now the force-field generating unit, whereas the reference-surface means, here assumed to be a rollfilm pressure-plate 8, now is the second, field-responsive sub-assembly. In this example, the layer 2M, 2D may be permanent-magnetic, electromagnetic, or polarized-dielectric, the magnetization/polarization vector being perpendicular (in either direction) to the planes of the laminate and the pressure plate.

In a further variation (not shown), on one hand the layer 3M, 30M, 3M', 3M", IIIM of the laminated sub-assembly is a permanent or electro magnet, while on the other hand only the structures of the previously magnetic force-field generating units 7M, 7M', 70M, LXXM are retained as such, but now in the form of passive, hard or soft magnetic materials.

Those skilled in the art will appreciate, based on the above, that all of the above configurations discussed in relation to the embodiments of the invention of the force-field responsive materials of FIGS. 1a through FIG. 1b may be used in the embodiment mode of FIG. 6 for the laminates 2M, 2D which form the force-field generating sub-assemblies, further that the laminates 2M, 2D together with the reference surface means 8, 7M, 7D of FIG. 6 may be used in this embodiment mode illustrated by FIGS. 2a, 2a', 3a, 3b, 4a, 4b, 4d, 5 and therefore these configurations need not be discussed again.

Figure 7:
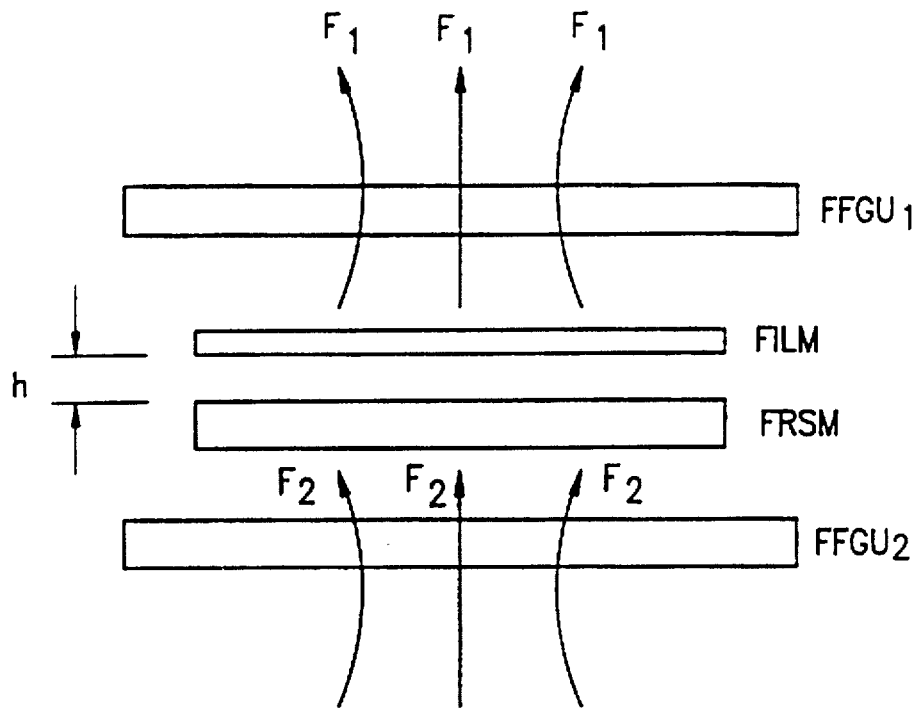
FIG. 7 shows a functional diagram of an embodiment wherein both sub-assemblies are force-field generating.

In another variation of the invention symbolically shown in FIG. 7, both sub-assemblies are force-field generating. The fields $F_1$ and $F_2$ from the force-field generating units $FFGU_1$ and $FFGU_2$ reinforce each other and press the film against the film reference surface means FRSM. Again, the embodiments discussed in relation to FIGS. 1a through 3c' and 4d, 5 may be adapted to the principles of the embodiment of FIG. 7 and thus redundant elaboration is superfluous.

Another embodiment mode of the invention concerns paper-backed film such as conventional 120 format film. The paper thickness is comparable to that of the conventional film-support and furthermore buckles on its own. Therefore, a substantially larger attraction must be provided for such film than for versions that are not backed by paper. Accordingly the invention provides booster means for such cases.

Figure 8A:
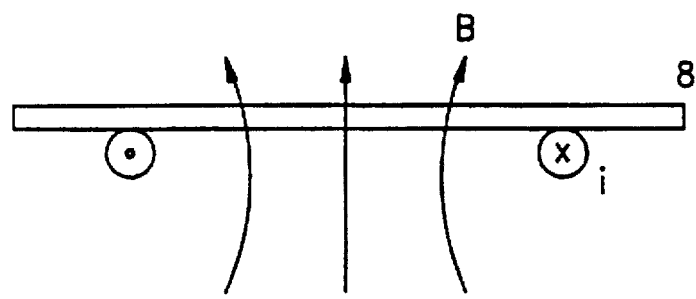
FIGS. 8a, 8b functionally show the symbolic structure of a booster for 120 film and its selective operation.

FIG. 8a symbolically shows an embodiment of a booster, in this instance it shows a vertical cross-section of a rollfilm pressure-plate 8 to the base of which is mounted a coil with current i generating a field B. The current i is controlled at times $t_1$ and $t_2$ as indicated in FIG. 8b depending on the presence or absence of paper backing.

Figure 8B:
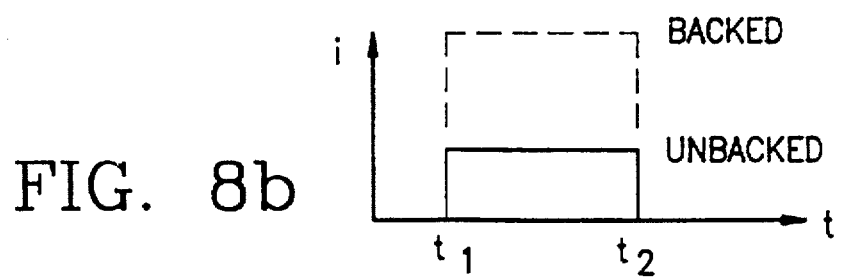

Those skilled in the art will recognize that the control principles already discussed above in relation to FIGS. 5, 5a and 5b are also applicable to the generalized embodiments both of FIG. 8a and FIG. 8b and moreover that boosting represented in these FIGS. 8a, 8b for the magnetic case also can be used in kindred manner in the dielectric versions.

In another variation (not shown), the pressure plate acting as the force-field generating unit is exchangeable, a comparatively weak unit being used for paper-unbacked film and a comparatively strong one for the paper-backed film such as 120 format film.

In an even further variation, the otherwise conventional paper-backed photographic film is modified by the elimination of the paper backing or by the insertion of any suitably boosted sub-assembly of the already discussed invention, or combination thereof.

Finally, those skilled in the art will appreciate that AC operation may be extended well into the ultrasonic range.

DESIGN CRITERIA

For 120/220 films and larger, film detachment from the reference surface usually is a sizable fraction of a millimeter, and at times may well exceed 1 mm.

Because of a number of other limitations, among which film resolving power and residual lens aberrations, only that film "flatness" shall be required in practice of which the deviation from mathematical flatness is anyway masked by the accumulation of said other limitations. This consideration allows saving electric power, where used, in operating the sub-assemblies of the invention.

Approximately a detachment of 50µ from the reference surface is admissible for 120/220 formats and of 100µ for the 4×5 format. (In general, the tolerable displacement from the ideal plane of focus increases with lens focal-length). Preferably, however, the maximum detachments should be half those figures or even less. Tests by the inventor indicate that most films will be well flattened by an effort of 1 gm/cm², that is, by an attraction of about 1,000 dynes/cm². Accordingly, this latter value should be the order of magnitude of the attraction exerted between the force-field generating unit and the multi-layer laminate. Moreover, the rigidity of the photographic-film supports is such that discretely applied attraction, for instance across field-inert gaps of the order of 1 cm, still will provide flatness.

A. Attraction

Some design criteria are briefly considered below to illustrate the practicality of the invention (a magnitude of 1 g/cm$^2$ of attraction is used in the estimates). Where the configuration of pole-piece and keeper across a slight gap substantially applies, the attraction per unit area is given by the simple formula $B^2/(2u_o)$, and under such circumstances B would need to be roughly 150 gauss.

As regards electrostatic attraction, the force of attraction per unit area in a warp gap such as h (FIG. 3a) is given by $\epsilon_o \xi^2/2$ with $\epsilon_o$ the permittivity of free space and $\xi$ the electrostatic field strength (mks). With a dielectric strength $\geq 10^7$ v/m and a field intensity of $10^7$ v/m, the attraction then would be about 4,500 dynes/cm$^2$.

B. Laminate Thickness

Rollfilms and 4×5 sheetfilms usually are 0.1 to 0.2 mm thick. Assuming that a 10% increase in thickness is acceptable, the multi-layer laminates 2 and II of the invention should be from 10 to 20µ thick. These values place upper limits on the thickness(es) of the force-field responsive layer(s). It should be noted that a 120 film fitted with a magnetic layer 3m of a thickness of 10µ would increase in weight by about 3g (three gram). In principle, however, force-field responsive or generating layers 3 may be from ½µ to 1 mm thick depending on particular conditions.

C. Magnetostatic Layer Materials

As indicated above, the magnetic material of the film layer 3m, IV' may be either in powder form or consist of a foil. Likely saturation values are about 5 kgauss for powder and 20 kgauss for foils.

D. Sheetfilm Holders

The dimension "e" of the conventional sheetfilm holder of FIG. 4 on one hand and the dimension "e" of those of the invention, illustratively indicated in FIG. 4c on the other hand, are slightly different:

The emulsion of the photographic rollfilm of the invention stays in the plane defined by the surface of the rollfilm guide rails on each longitudinal side of the image aperture of the camera because the pressure plate is forced back by the thickness the multi-layer laminate. However in the case of sheetfilm, its emulsion will be placed closer to the lens by the thickness of the multi-layer laminate of the invention. While as a rule such a discrepancy in the sheetfilm case will be negligible ($\approx$20µ), it ought to be taken into account nevertheless when designing the sheetfilm holders of the invention.

E. Energy Requirements

The order of magnitude of the work required to flatten a film area of 6cm×6cm detached by a warp gap h =0.5 mm from the pressure plate and opposing a force per unit area of 1,000 dynes/cm$^2$ is $\approx 2\times 10^{-3}$ joules. This is a minute quantity compared to the energy stored in, for example, an average-size button battery.

Only negligible energy is required to magnetize the electromagnets under consideration. During film exposure, however, a current "i" must be applied for a time "t" to keep the film attracted. Assuming that i$\leq$0.1 amp and t$\leq$0.2 seconds, the energy is "it"$\leq$0.02 amp-sec or $\approx 6\times 10^{-5}$ (ma)(hr). Small batteries readily store tens and hundreds of (ma)(hr).

F. Booster Options

While there is much latitude in the paper-unbacked case in matching one sub-assembly to the other, less is available when paper-backed film also must be serviced by essentially the same apparatus. Assuming that the presence of paper requires an attractive force that is five-fold higher, and that a factor of two is needed for tolerances, the required attraction for the paper-backed film would be ten-fold that of the paper-unbacked film. Assuming again that in the paper-backed case the magnetic layer 3, 30, IV' is just saturated, then with the attraction being proportional to B$^2$, the vector B in the layer 3, 30, IV for the paper unbacked case could not be higher than about ⅓ the saturation value of this layer.

G. Emulsion Insensitivity To Force-Fields

The emulsion is immersed in DC or AC magnetic or electric fields. In quantum terms, photographic exposure raises the energy levels by hf, where f is the frequency of the incident radiation. On that basis alone, one can expect that DC fields would have no effect on the emulsion, and that low frequency AC fields would also have a minimal effect. Experiments by the inventor with DC magnetic fields of roughly 10 kgauss and AC electric fields (60 Hz) of roughly 7,000 V/m applied locally to an emulsion failed to affect the (black & white, medium-speed) negatives as shown by the enlarged prints.

H. AC Hysteresis

Finally, crude estimates indicate that even at a frequency of 1,000 Hz and exposure times $\leq$0.2 s, i.e., for $\leq$200 hysteresis cycles, the energy losses are trivial compared with the energy stored in charged button batteries.

Having thus described preferred embodiments of the invention in sufficient detail to enable one skilled in the art to make and use the invention, it is to be understood furthermore that no portion of the specification or drawings is to be construed as limiting, and that the invention is intended to encompass all variations of the preferred embodiments. Consequently, it is intended by the inventor that the invention be limited solely by the appended claims.

I claim:

1. A method for flattening a photographic film with emulsion and support at least during an exposure of an image area on the film, said exposure to be followed by film advance or film exchange, comprising the steps of:

(a) fitting the film with systems responsive to an electric force-field (b) providing a reference surface structure with a reference surface for the film, (c) applying an electrical force-field to cause the film to be attracted to the reference surface structure and thereby flatten said film against the reference surface at least across the image area and at least during image exposure.

2. A method as claimed in claim 1, wherein the electric force field emanates from a source selected from the group consisting of permanent sources, a source of constant-amplitude AC, a source of constant-amplitude DC, a source of amplitude-modulated AC, and a source of amplitude-modulated DC, said selected source driving into polarization a soft-polarizable, force-field producing body selected from the group consisting of dielectrics and ferroelectrics, at least during the time of image exposure, and wherein said selected source is shut off before film advance or film exchange.

3. A method for flattening a photographic film with emulsion and support at least during an exposure of an image area on the film, said exposure to be followed by film advance or film exchange, comprising the steps of:

(a) fitting the film with systems responsive to an electric force-field, (b) providing a reference surface structure with a reference surface for the film, (c) applying an electrical force-field to cause the film to be attracted to the reference surface structure and thereby flatten said film against the reference surface at least across the image area and at least during image exposure, wherein the electric force-field is generated by a source selected from the group consisting of constant-amplitude AC and DC sources and amplitude-modulated AC and DC sources, wherein said source drives into polarization a soft-polarizable, force-field producing body selected from the group consisting of dielectrics and ferroelectrics at least during the time of image exposure, and wherein said source is shut off before film advance or film exchange, wherein the step of applying the electrical force field comprises a sequence of at least one initial step, within which initial step at least a first said electric force-field is applied during the time of image exposure, followed by at least one final step, within which final step at least a second said electric force-field is applied during part or all of the time interval between the end of image exposure and the beginning of film advance or exchange, whereby films with electrically force-field responsive systems susceptible to hysteresis effects induced by said force-fields applied for image flattening are subsequently subjected to other force-fields substantially negating said hysteresis.

4. A method for flattening a photographic film with emulsion and support at least during an exposure of an image area on the film, said exposure to be followed by film advance or film exchange, comprising the steps of:

(a) fitting the film with systems responsive to an electric force-field, (b) providing a reference surface structure with a reference surface for the film, (c) applying an electrical force-field to cause the film to be attracted to the reference surface structure and thereby flatten said film against the reference surface at least across the image area and at least during image exposure, wherein the electric force-field is generated by a source selected from the group consisting of constant-amplitude AC and DC sources and amplitude-modulated AC and DC sources, wherein said source drives into polarization a soft-polarizable, force-field producing body selected from the group consisting of dielectrics and ferroelectrics at least during the time of image exposure, and wherein said source is shut off before film advance or film exchange, said applying step comprising a sequence of at least one initial step, within which initial step at least a first said electric force-field is applied during the time of image exposure, followed by at least one final step, within which final step at least a second said electric force-field is applied during part or all of the time interval between the end of image exposure and the beginning of film advance or exchange in such manner that in said final step substantial repulsion is achieved between the reference surface structure and the photographic film.

5. A method for flattening a photographic film with emulsion and support at least during an exposure of an image area on the film, said exposure to be followed by film advance or film exchange, comprising the steps of:

(a) fitting the film with systems responsive to an AC magnetic force-field, (b) providing a reference surface structure with a reference surface for the film, (c) generating, by power application, an AC magnetic force-field to cause the film to be attracted against the reference surface.

6. A method as claimed in claim 5, comprising a sequence of at least one initial step, within which initial step at least one magnetic force-field is applied during the time of image exposure, followed by at least one final step, within which final step at least one other magnetic force-field is applied during part or all of the time interval between the end of image exposure and the beginning of film advance or exchange, in order that films with magnetically force-field responsive systems susceptible to hysteresis effects induced by said force-fields applied for image flattening be subsequently subjected to other force-fields substantially negating said hysteresis.

7. A method for flattening a photographic film with emulsion and support at least during an exposure of an image area on the film, said exposure to be followed by film advance or film exchange, comprising the steps of:

(a) fitting the film with systems responsive to a force-field selected from the group consisting of electric force-fields and AC magnetic force-fields, (b) providing a reference surface structure with a reference surface for the film, (c) applying said force-field selected from the group consisting of electric force-fields and AC magnetic force-fields to cause the film to be attracted to the reference surface structure and thereby flattening said film at least across the image area and at least during image exposure against the reference surface, wherein step (c) comprises the step of flattening against the reference surface a photographic film selected from the group consisting of a rollfilm and a sheetfilm.

8. A method for flattening a photographic film with emulsion and support at least during an exposure of an image area on the film, said exposure to be followed by film advance or film exchange, comprising the steps of:

(a) fitting the film with systems responsive to a force-field selected from the group consisting of electric force-fields and AC magnetic force-fields, (b) providing a reference surface structure with a reference surface for the film, (c) applying said force-field selected from the group consisting of electric force-fields and AC magnetic force-fields to cause the film to be attracted to the reference surface structure and thereby flattening said film against the reference surface at least across the image area and at least during image exposure, wherein step (c) comprises the step of flattening the photographic film against a reference surface of a reference-surface structure selected from the group consisting of a roll film pressure-plate and a sheetfilm-holder partition.

9. A method for flattening a photographic film with emulsion and support at least during an exposure of an image area on the film, said exposure to be followed by film advance or film exchange, comprising the steps of:

(a) fitting the film with systems responsive to a force-field selected from the group consisting of electric force-fields and AC magnetic force-fields, (b) providing a reference surface structure with a reference surface for the film, (c) applying said force-field selected from the group consisting of electric force-fields and AC magnetic force-fields to cause the film to be attracted to the reference surface structure and thereby flattening said film against the reference surface at least across the image area and at least during image exposure, wherein the attraction produced by said force-field and flattening the photographic film against the reference surface is between 10 (ten) and 100,000 (one hundred thousand) dynes/cm$^2$.

10. A combined force-field responsive system and photographic film wherein said force field responsive system is responsive to applied fields selected from the group consisting of electric force fields and AC magnetic force-fields for attracting said photographic film toward a reference surface of a reference surface structure and to flatten the film against said reference surface at least during image exposure, wherein said photographic film comprises an emulsion on a support having a support emulsion-near side and a support emulsion-distant side.

11. The combined force-field responsive system and photographic film as claimed in claim 10, wherein said system includes the film support.

12. The combined force-field responsive system and photographic film as claimed in claim 10, wherein the film support is selected from the group consisting of a force-field responsive dielectric and a force-field responsive ferroelectric.

13. The combined force-field responsive system and photographic film as claimed in claim 10, in the form of a laminate made up of at least one force-field responsive layer, said laminate being temporarily bonded by a bonding layer to the photographic film at said support emulsion-distant side.

14. The combined force-field responsive system and photographic film as claimed in claim 13, wherein said laminate is removable from the film support by a process selected from the group consisting of peeling off; dissolution in solvents; and dissolution in aqueous liquors.

15. The combined force-field responsive system and photographic film as claimed in claim 13, wherein the thickness of said force-field responsive laminate is between 0.5 (half) and 1,000 (a thousand) microns.

16. The combined force-field responsive system and photographic film as claimed in claim 10, in the form of a laminate comprising an additional layer positioned on that side of the laminate which is away from the photographic film support and said additional layer is selected from the group consisting of:

a low-friction layer, an emulsion protective layer protecting a rollfilm in a wound state, an emulsion protective layer protecting a stack of sheetfilms in a stored state, and a layer offering both low friction and emulsion protection.

17. The combined force-field responsive system and photographic film as claimed in claim 10, in the form of a laminate comprising at least one force-field responsive layer in the form of a matrix of substantially uniformly distributed, embedded particles responsive to said applied fields.

18. The combined force-field responsive system and photographic film as claimed in claim 10, in the form of a laminate comprising at least one force-field responsive material-layer in the form of a powder.

19. The combined force-field responsive system and photographic film as claimed in claim 18, wherein the powder distribution is selected from the group consisting of a substantially continuous distribution; a distribution of confined powder-containing zones each of an area small compared with the film image area and separated from one another by force-field inert gaps and evincing defined geometric contours; and a distribution in confined powder-containing zones each of an area small compared with the film image area and evincing geometrically random contours and separated from one another by force-field inert gaps.

20. The combined force-field responsive system and photographic film as claimed in claim 10, in the form of a laminate comprising at least one force-field responsive material layer in the form of a foil.

21. The combined force-field responsive system and photographic film as claimed in claim 20, wherein said foil is predominantly continuous.

22. The combined force-field responsive system and photographic film as claimed in claim 10 in the form of a laminate made up of at least one force-field responsive layer, wherein said force-field responsive layer is composed of discrete and mutually spaced force-field responsive elements imbedded in the laminate.

23. The combined force-field responsive system and photographic film as claimed in claim 22, wherein the at least one force-field responsive layer is composed of N elements i, and wherein N=1,2,3 . . . i . . . N, in the image area of the photographic film and each of said elements has an area $a_i$ such that $$\sum_{i=1}^{N} a_i < A,$$

where A is the image area.

24. The combined force-field responsive system and photographic film as claimed in claim 22, wherein the at least one force-field responsive layer includes force-field responsive elements in the form of small, randomly distributed flakes of arbitrary contours.

25. The combined force-field responsive system and photographic film as claimed in claim 22, wherein the force-field responsive elements are selected from the group consisting of geometrically definable solids with regular geometric shapes, and geometrically irregular solids.

26. The combined force-field responsive system and photographic film as claimed in claim 10, in the form of a laminate comprising at least one force-field responsive material layer in the form of a foil, wherein said force-field responsive layer is composed of force-field responsive elements belong to any combination selected from the group consisting of geometrically definable solids with regular geometric shapes, said solids being mutually separated by force-field inert spaces, and geometrically irregular solids mutually spaced apart by force-field inert gaps.

27. The combined force-field responsive system and photographic film as claimed in claim 10 in the form of a laminate comprising at least one force-field responsive material layer, wherein said at least one force-field responsive layer is composed of discrete and mutually spaced force-field responsive elements imbedded in the laminate, wherein the at least one force-field responsive layer is composed of N elements i, where N=1,2,3 ... i ... N, in the image area of the photographic film and each of said elements has an area $a_i$ such that $$\sum_{i=1}^{N} a_i < A,$$

where, A is the image area, and
wherein, the photographic film is attracted against a planar reference surface of a reference surface structure.

28. A combined force-field responsive system and photographic film as claimed in claim 10, comprising bonding layer bonding said force-field responsive system to said photographic film and containing an antihalation agent.

29. A force-field generating unit to apply a force-field to a photographic film which is combined with a force-field responsive system to attract said film toward a reference surface of a reference surface structure in order to flatten said film against said reference surface, said force-field generating unit is:
  permanently polarized dielectric bodies and permanently polarized ferroelectric bodies arranged to produce permanent electric force-fields or soft-polarizable dielectric bodies and soft-polarizable ferroelectric bodies driven by power sources in the modes of steady-state AC or steady-state DC or amplitude-modulated AC or DC to generate steady-state AC or DC electric force-fields or amplitude-modulated AC or DC electric force-fields or;
  one or more pairs of metal plates or foils, each pair being driven by power sources in the modes of steady-state AC or DC and of amplitude-modulated AC or DC across each pair to generate steady-state AC or DC electric force-fields and amplitude-modulated AC or DC electric force-fields or;
  a magnetizable body driven in the modes of constant-amplitude AC or amplitude-modulated AC to generate constant-state or amplitude-modulated AC magnetic fields.

30. A force-field generating unit as claimed in claim 29 including a control-and-timing unit incorporated therein, wherein said control-and-timing unit controls the force-field generating unit in such a manner that in at least one initial step lasting at least as long as an image exposure, a force-field is generated, and in that consecutively within at least one final step lasting from the end of image exposure to the beginning of film exchange a force-field is generated which substantially negates hysteresis effects induced by the force-field of the at least one initial step in hysteresis-susceptible constituents of the force-field responsive system.

31. A force-field generating unit as claimed in claim 29 including a control-and-timing unit incorporated therein, wherein said control-and-timing unit controls the force-field generating unit in such manner that there is at least one initial step lasting as long as image exposure and at least one final step lasting from the end of image exposure to the beginning of film advance or film exchange and wherein the force-field within the final step causes repulsion between the reference surface structure and the photographic film.

32. A force-field generating unit as claimed in claim 29, comprising a mounting means for said unit, said mounting means being selected from the group consisting of the body of a rollfilm camera and the sheetfilm-holder of a large camera.

33. A force-field generating unit as claimed in claim 29, which is integrated into a reference surface structure selected from the group consisting of a rollfilm-camera pressure plate and a partition of a view-camera sheetfilm-holder.

34. A force-field generating unit as claimed in claim 29, generating a force-field acting on a force-field responsive system so that, when the force-field responsive system is attracted to a reference surface structure and is flattened against the reference surface of said structure, the generated force-field evinces a field-intensity vector which is parallel or perpendicular to the longitudinal center line of said reference surface.

35. A force-field generating unit as claimed in claim 29, composed of a plate selected from the group consisting of a rollfilm-camera pressure-plate and a sheetfilm-holder partition of a large format camera and by a plate integrated into said rollfilm-camera pressure-plate and by a plate integrated into said large-format camera sheetfilm-holder partition, wherein:
  when any of said plates is a hard-polarized dielectric or a hard-polarized ferroelectric, it generates a permanent electric force-field, and when said plate is a soft dielectric or ferroelectric, it is polarized at least during image exposure by a constant AC or DC amplitude power source to generate a constant AC or DC amplitude electric force-field or it is polarized by an amplitude-modulated AC or DC power source to generate an amplitude-moderated AC or DC electric force-field.

36. A force-field generating unit as claimed in claim 29, composed of a plate selected from the group consisting of a rollfilm-camera pressure-plate and a sheetfilm-holder partition of a large-format camera and by a plate integrated into said rollfilm-camera pressure-plate and by a plate integrated into said large-format camera sheetfilm-holder partition, wherein any of said plates is:
  a soft-magnetizable material driven into magnetization by a power source selected from the group consisting of a constant amplitude AC power source to generate a constant amplitude AC magnetic force-field and amplitude-modulated AC power source to generate an amplitude-modulated AC magnetic force-field.

37. A force-field generating unit as claimed in claim 35 or 36, integrated into the pressure-plate of a rollfilm camera or into the partition of a sheetfilm-holder of a large-format camera, and composed of discrete elements either inherently active or being polarizable or magnetizable by power sources.

38. A force field-generating unit as claimed in claim 37, wherein the discrete elements integrated into said plate are a total of M, where M=1, 2 ... M, such that for a surface, S, of said plate, with each element having one largest surface $s_j$, $$\sum_{j=1}^{M} s_j < S.$$

39. A force-field generating unit as claimed in claim 29, wherein the reference surface structure is an exchangeable rollfilm reference surface structure.

40. An assembly comprising a combined force-field responsive system and photographic film, wherein said force field responsive system is responsive to applied fields selected from the group consisting of electric and magnetic force-fields for attracting said photographic film toward a reference surface of a reference surface structure and to flatten the film against said reference surface at least during image exposure, and wherein said photographic film comprises an emulsion on a support having a support emulsion-near side and a support emulsion-distant side and a force-field generating unit as claimed in claim 29, wherein the force-field generating unit comprises means for selectively generating either an attraction appropriate for film lacking paperbacking or an attraction appropriate for film fitted with paperbacking.

41. A force-field generating unit used in flattening photographic film composed of an even number of mutually spaced and substantially coplanar metal plates or foils mounted in electrically insulating manner relative to a reference surface structure in one of the configurations consisting of being on, in or spaced from said structure, said plates or foils being connected pairwise by one plate or foil of the at least one pair to one pole of an AC or DC power source and by the other plate or foil of the at least one pair to the other pole of the said AC or DC power source, wherein the AC source evinces phase and the DC power source evinces polarity, and where, if more than one pair of plates or foils is used, said pairs are connected in parallel in such manner that any plate or foil intermediary between another two plates or foils shall be driven at a phase or a polarity opposite said other two plates' or foils phases' or polarities.

42. A force-field generating unit used in flattening photographic film as claimed in any claim 29, 32–36, or 41, wherein the frequency of the AC force-field is not more than 100 (one hundred) kHz (kilohertz).

43. A control-and-timing unit for a combined force-field responsive system and photographic film wherein said force field responsive system is responsive to applied fields selected from the group consisting of electric and magnetic force-fields for attracting said photographic film toward a reference surface of a reference surface structure and to flatten the film against said reference surface at least during image exposure, wherein said photographic film comprises an emulsion on a support having a support emulsion-near side and a support emulsion-distant side operating an AC force-field generating unit in such manner that after each image exposure but before film-advance or film-exchange, a previously applied force-field is made to decay substantially from its amplitude during said exposure over a number of ensuing cycles which is less than the total number of cycles possible in a time interval between the end of image exposure and the beginning of film advance or exchange for the purpose of substantially demagnetizing or electrically depolarizing said force-field responsive system.

44. An assembly composed of a first force-field generating unit in the form of a planar laminate including a metal layer, wherein said laminate is fitted to a photographic film with emulsion and support to form one plate of a parallel-plate capacitor, and a second force-field generating unit being an at least partly metallic photographic-film reference-surface structure having a reference surface and forming the second plate of said parallel plate capacitor, said parallel plate capacitor being operated with DC or AC power and attracting said photographic film to said reference surface structure and flattening the film against said reference surface.

45. An assembly comprising a combined force-field responsive system and photographic film, wherein said force field responsive system is responsive to fields selected from the group consisting of electric and magnetic force-fields and said force-fields are applied by a force-field generating unit for attracting said photographic film toward a reference surface of a reference surface structure and to flatten the film against said reference surface at least during image exposure, wherein a force of attraction between the force-field responsive system and the force field generating unit is in the range of 10 (ten) to 100,000 (one hundred thousand) dynes/cm$^2$.

46. An assembly for flattening a photographic film with emulsion and support against a reference surface of a reference-surface structure, composed of two cooperating force-field generating units, one affixed to the body of a camera and the other affixed to said film, each force-field generating unit being an independent unit and generating a mutually reinforcing force-field flattening the film against the reference surface.

47. A large view-camera, double-sheetfilm holder with a partition and a set of two removable sheetfilm masks engageable each on one side of the said holder into its masking position, where, in the set of two sheetfilm-holder masks, each mask when inserted into its masking position acts as a force-field generating unit and cooperates with and reinforces the other mask, and each mask produces a force-field in such manner that when the sheetfilm holder is loaded with at least one sheetfilm fitted with a force-field responsive system then, before exposure of this sheetfilm, the force-field producing mask covering said sheetfilm to be exposed is removed while the other force-field producing mask remains in its masking position, and said remaining mask attracts the sheetfilm to be exposed, and then being exposed, against said partition.

48. A sheetfilm holder as claimed in claim 47, wherein each sheetfilm holder is keyed on each mask-engaging side to accept one correspondingly keyed film-mask so that when both masks are engaged into their masking positions in said holder, they can only produce additive force-fields.

49. A combined force-field responsive system and photographic film wherein said force field responsive system is responsive to applied fields selected from the group consisting of electric force fields and AC magnetic force-fields for attracting said photographic film toward a reference surface of a reference surface structure and to flatten the film against said reference surface at least during image exposure, wherein said photographic film comprises an emulsion on a support having a support emulsion-near side and a support emulsion-distant side, and wherein the force-field responsive system is in the form of a laminate bonded by a bonding layer to the photographic film support at said emulsion-distant side, wherein the laminate comprises n force-field responsive layers, where n =2, 3 . . . , separated from one another by a comparatively force-field inert layer, and wherein that of the n force-field responsive layers which is nearest the photographic film support is combined with a bonding layer bonding the laminate to the support.

* * * * *